United States Patent
Kang et al.

(10) Patent No.: US 12,192,945 B2
(45) Date of Patent: Jan. 7, 2025

(54) REGISTRATION SWITCHING METHOD, REQUEST PROCESSING METHOD, INFORMATION SENDING METHOD, AND RELATED DEVICE

(71) Applicant: VIVO MOBILE COMMUNICATION CO., LTD., Guangdong (CN)

(72) Inventors: Yanchao Kang, Guangdong (CN); Fei Qin, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 381 days.

(21) Appl. No.: 17/534,578

(22) Filed: Nov. 24, 2021

(65) Prior Publication Data
US 2022/0086789 A1    Mar. 17, 2022

Related U.S. Application Data

(63) Continuation of application No. PCT/CN2020/092521, filed on May 27, 2020.

(30) Foreign Application Priority Data

May 28, 2019   (CN) .......................... 201910453629.4

(51) Int. Cl.
*H04W 36/14*    (2009.01)
*H04W 60/02*    (2009.01)

(52) U.S. Cl.
CPC ....... *H04W 60/02* (2013.01); *H04W 36/1443* (2023.05)

(58) Field of Classification Search
CPC ...................................................... H04W 60/02
USPC .......................................................... 370/331
See application file for complete search history.

(56) References Cited

U.S. PATENT DOCUMENTS

| | | | |
|---|---|---|---|
| 2016/0183156 A1* | 6/2016 | Chin | H04W 74/006 370/331 |
| 2018/0220486 A1 | 8/2018 | Tseng et al. | |
| 2019/0037377 A1 | 1/2019 | Ke et al. | |
| 2019/0098596 A1* | 3/2019 | Basu Mallick | H04W 76/15 |
| 2019/0150052 A1* | 5/2019 | Wang | H04W 36/305 370/331 |

FOREIGN PATENT DOCUMENTS

| | | | | |
|---|---|---|---|---|
| CN | 105872999 A | * | 8/2016 | ........ H04W 36/0033 |
| CN | 106961456 A | | 7/2017 | |
| CN | 108156636 A | | 6/2018 | |

(Continued)

OTHER PUBLICATIONS

Huawei, "Procedures for Inter-RAT mobility support to and from NB-IoT", 3GPP TSG-SA WG2 Meeting #130, S2-1900630, Kochi, India, Jan. 21-25, 2019.

*Primary Examiner* — Sibte H Bukhari
(74) *Attorney, Agent, or Firm* — Price Heneveld LLP

(57) ABSTRACT

The present disclosure provides a registration switching method, a request processing method, an information sending method, and a related device. The method includes: camping on a network node supporting an NB service, and performing combined registration with a network supporting the NB service and a network supporting a WB service; and switching to a network node supporting the WB service, to transmit the WB service.

11 Claims, 21 Drawing Sheets

(56) References Cited

FOREIGN PATENT DOCUMENTS

| CN | 108696906 A | 10/2018 |
| EP | 3358887 A1 | 8/2018 |
| WO | 2018007642 A1 | 11/2018 |

* cited by examiner

REGISTRATION SWITCHING METHOD, REQUEST PROCESSING METHOD, INFORMATION SENDING METHOD, AND RELATED DEVICE

CROSS-REFERENCE TO RELATED APPLICATIONS

This application is a continuation application of PCT Application No. PCT/CN2020/092521 filed on May 27, 2020, which claims priority to Chinese Patent Application No. 201910453629.4, filed on May 28, 2019 in China, disclosures of which are incorporated herein by reference in their entireties.

TECHNICAL FIELD

The present disclosure relates to the field of communications technologies, and in particular, to a registration switching method, a request processing method, an information sending method, and a related device.

BACKGROUND

Currently, because a terminal supporting a narrowband (NB) mode and a wideband (Wide Band, WB) mode is limited by an Internet of Things (IoT) chip, the terminal can only work in the NB mode or the WB mode. The NB mode is a mode in which the terminal obtains an NB-IoT service, and the WB mode is a mode in which the terminal obtains an LTE/NR service. In this way, the terminal can only obtain a service in the NB mode, and cannot perform high-rate data transmission, thereby affecting service experience of a user.

SUMMARY

According to a first aspect, an embodiment of the present disclosure provides a registration switching method. The method is applied to a terminal supporting an NB capability and a wideband (WB) capability and includes:
  camping on a network node supporting an NB service, and performing combined registration with a network supporting the NB service and a network supporting a WB service; and
  switching to a network node supporting the WB service, to transmit the WB service.

According to a second aspect, an embodiment of the present disclosure provides a registration switching method. The method is applied to a network node supporting an NB service and includes:
  performing, for a terminal, combined registration with a network node supporting a WB service; and
  assisting the terminal in switching to the network node supporting the WB service.

According to a third aspect, an embodiment of the present disclosure provides a registration switching method. The method is applied to a network node supporting a WB service and includes:
  accepting a registration request initiated by a network node supporting an NB service for a terminal supporting the WB service; and
  providing the WB service for the terminal.

According to a fourth aspect, an embodiment of the present disclosure provides a request processing method. The method is applied to an access network node supporting an NB service and includes:
  receiving a first radio resource control RRC message sent by a terminal supporting the NB service and a WB service, where a non-access stratum NAS message included in the first RRC message is an extended service request and is used to request the WB service;
  sending the extended service request to a network node supporting the NB service;
  receiving a UE context modification request sent by the network node supporting the NB service, where the UE context modification request carries a WB indication; and
  releasing a network resource allocated to the terminal.

According to a fifth aspect, an embodiment of the present disclosure provides an information sending method. The method is applied to an access network node supporting a WB service and includes:
  sending, to a terminal supporting an NB service and the WB service in an RRC connection release message, information about a PLMN with which the terminal is registered last time.

According to a sixth aspect, an embodiment of the present disclosure provides a terminal. The terminal is a terminal supporting an NB capability and a WB capability, and the terminal includes:
  a registration module, configured to: camp on a network node supporting an NB service, and perform combined registration with a network supporting the NB service and a network supporting a WB service; and
  a switching module, configured to switch to a network node supporting the WB service, to transmit the WB service.

According to a seventh aspect, an embodiment of the present disclosure provides a network node. The network node is a network node supporting an NB service and includes:
  a registration module, configured to perform, for a terminal, combined registration with a network node supporting a WB service; and
  a switching assistance module, configured to assist the terminal in switching to the network node supporting the WB service.

According to an eighth aspect, an embodiment of the present disclosure provides a network node. The network node is a network node supporting a WB service and includes:
  a registration module, configured to accept a registration request initiated by a network node supporting an NB service for a terminal supporting the WB service; and
  a service module, configured to provide the WB service for the terminal.

According to a ninth aspect, an embodiment of the present disclosure provides an access network node. The access network node is an access network node supporting an NB service and includes:
  a receiving module, configured to receive a first radio resource control RRC message sent by a terminal supporting the NB service and a WB service, where a non-access stratum NAS message included in the first RRC message is an extended service request and is used to request the WB service;
  a sending module, configured to send the extended service request to a network node supporting the NB service, where
  the receiving module is further configured to receive a UE context modification request sent by the network node supporting the NB service, where the UE context modification request carries a WB indication; and a release module, configured to release a network resource allocated to the terminal.

According to a tenth aspect, an embodiment of the present disclosure provides an access network node. The access network node is an access network node supporting a WB service and includes:

a sending module, configured to send, to a terminal supporting an NB service and the WB service in an RRC connection release message, information about a PLMN with which the terminal is registered last time.

According to an eleventh aspect, an embodiment of the present disclosure provides a terminal, where the terminal is a terminal supporting an NB capability and a WB capability and includes a memory, a processor, and a program that is stored in the memory and that can be run on the processor, where when the program is executed by the processor, the steps of the registration switching method in the first aspect are implemented.

According to a twelfth aspect, an embodiment of the present disclosure provides a network node, where the network node is a network node supporting an NB service and includes a memory, a processor, and a program that is stored in the memory and that can be run on the processor, where when the program is executed by the processor, the steps of the registration switching method in the second aspect are implemented.

According to a thirteenth aspect, an embodiment of the present disclosure provides a network node, where the network node is a network node supporting a WB service and includes a memory, a processor, and a program that is stored in the memory and that can be run on the processor, where when the program is executed by the processor, the steps of the registration switching method in the third aspect are implemented.

According to a fourteenth aspect, an embodiment of the present disclosure provides an access network node, where the access network node is an access network node supporting an NB service and includes a memory, a processor, and a program that is stored in the memory and that can be run on the processor, where when the program is executed by the processor, the steps of the request processing method in the fourth aspect are implemented.

According to a fifteenth aspect, an embodiment of the present disclosure provides an access network node, where the access network node is an access network node supporting a WB service and includes a memory, a processor, and a program that is stored in the memory and that can be run on the processor, where when the program is executed by the processor, the steps of the information sending method in the fifth aspect are implemented.

According to a sixteenth aspect, an embodiment of the present disclosure provides a computer-readable storage medium, where the computer-readable storage medium stores a computer program, and when the computer program is executed by a processor, the steps of the registration switching method in the first aspect are implemented, or when the computer program is executed by a processor, the steps of the registration switching method in the second aspect are implemented, or when the computer program is executed by a processor, the steps of the registration switching method in the third aspect are implemented, or when the computer program is executed by a processor, the steps of the request processing method in the fourth aspect are implemented, or when the computer program is executed by a processor, the steps of the information sending method in the fifth aspect are implemented.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the scope of the present disclosure.

The term "include" and any other variants in the specification and claims of this application mean to cover the non-exclusive inclusion, for example, a procedure, method, system, product, or device that includes a list of steps or units is not necessarily limited to those steps or units, but may include other steps or units not expressly listed or inherent to such a procedure, method, product, or device. In addition, "and/or" used in the specification and claims means at least one of the connected objects. For example, A and/or B represents the following three cases: Only A exists, only B exists, and both A and B exist. Similarly, "at least one of A or B" or "at least one of A and B" used in the specification and claims represents the following cases: only A exists, only B exists, or both A and B exist.

In the embodiments of the present disclosure, the word such as "example" or "for example" is used to represent giving an example, an illustration, or a description. Any embodiment or design scheme described as "exemplary" or "for example" in the embodiments of the present disclosure should not be construed as being more preferred or advantageous than other embodiments or design schemes. To be precise, the use of the term such as "exemplary" or "for example" is intended to present a related concept in a specific manner.

The embodiments of the present disclosure are described below with reference to the accompanying drawings. A registration switching method, a request processing method, an information sending method, and a related device provided in the embodiments of the present disclosure may be applied to a wireless communications system. The wireless communications system may be a 5G system, an evolved Long Term Evolution (eLTE) system, a Long Term Evolution (LTE) system, a subsequent evolved communications system, or the like.

Figure 1:
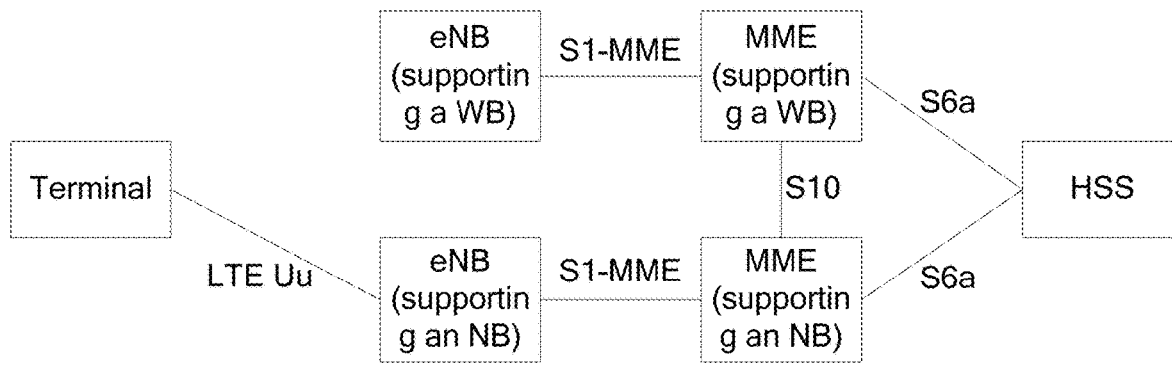
FIG. 1 to FIG. 4 are schematic diagrams of a network architecture to which the embodiments of the present disclosure are applied.

Referring to FIG. 1, FIG. 1 is a schematic diagram 1 of a network architecture to which the embodiments of the present disclosure are applied. As shown in FIG. 1, a terminal may communicate, through an LTE Uu interface, with a base station (for example, an eNB) supporting an NB service. The base station supporting the NB service may communicate, through an S1-mobility management entity (MME) interface, with an MME supporting the NB service. The MME supporting the NB service may communicate, through an S10 interface, with an MME supporting a WB service. The MME supporting the NB service and the MME supporting the WB service may communicate with a home subscriber server (HSS) through an S6a interface. A base station supporting the WB service may communicate, through the S1-MME interface, with the MME supporting the WB service. Certainly, the terminal may further communicate, through the LTE Uu interface, with the base station supporting the WB service.

Figure 2:
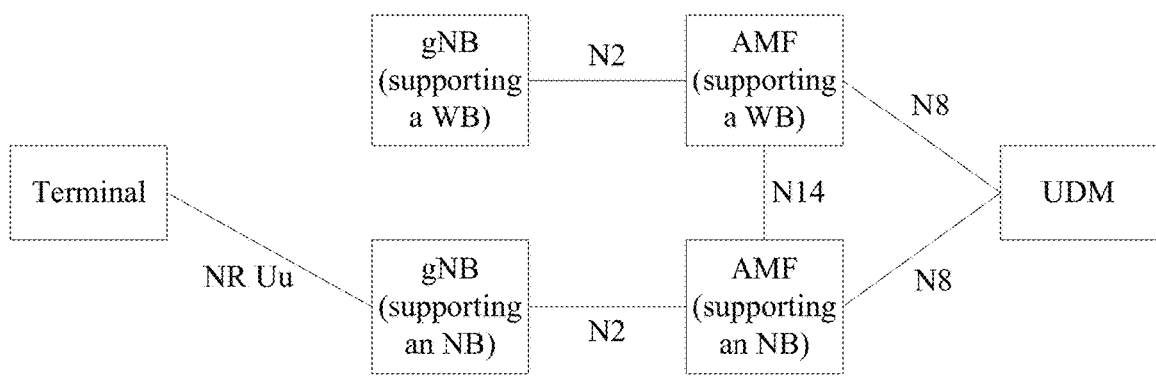

Referring to FIG. 2, FIG. 2 is a schematic diagram 2 of a network architecture to which the embodiments of the present disclosure are applied. As shown in FIG. 2, a terminal may communicate, through an NR U interface, with a base station (for example, a gNB) supporting an NB service. The base station supporting the NB service may communicate, through an N2 interface, with an access management function (AMF) supporting the NB service. The AMF supporting the NB service may communicate, through an N14, with an AMF supporting a WB service. The AMF supporting the NB service and the AMF supporting the WB service may communicate with a user data management (UDM) through an N8 interface. A base station supporting the WB service may communicate, through the N2 interface, with the AMF supporting the WB service. Certainly, the terminal may further communicate, through the NR Uu interface, with the base station supporting the WB service.

Figure 3:
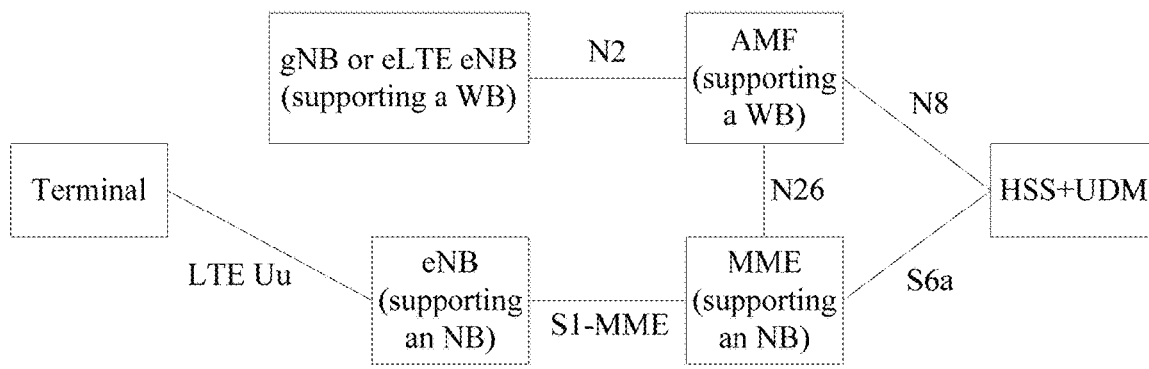

Referring to FIG. 3, FIG. 3 is a schematic diagram 3 of a network architecture to which the embodiments of the present disclosure are applied. As shown in FIG. 3, a terminal may communicate, through an LTE Uu interface, with a base station (for example, an eNB) supporting an NB service. The base station supporting the NB service may communicate, through an S1-MME interface, with an MME supporting the NB service. The MME supporting the NB service may communicate, through an N26 interface, with an AMF supporting a WB service. The MME supporting the NB service may communicate with an HSS through an S6a interface. The AMF supporting the WB service may communicate with a UDM through an N8 interface. A 5G base station (for example, a gNB) or a 4G base station (for example, an eLTE eNB) supporting the WB service may communicate, through an N2 interface, with the AMF supporting the WB service. Certainly, the terminal may further communicate, through a Uu interface, with the 5G base station or the 4G base station supporting the WB service.

Figure 4:
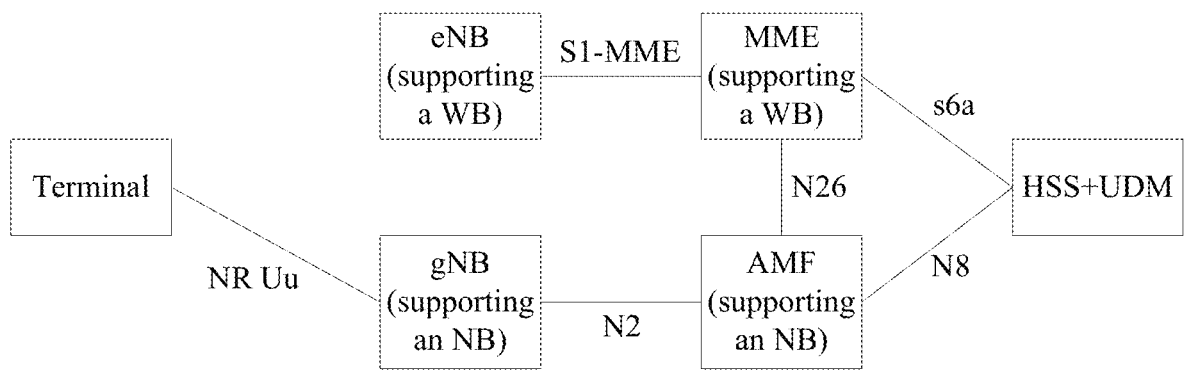

Referring to FIG. 4, FIG. 4 is a schematic diagram 4 of a network architecture to which the embodiments of the present disclosure are applied. As shown in FIG. 4, a terminal may communicate, through an NR U interface, with a base station (for example, a gNB) supporting an NB service. The base station supporting the NB service may communicate, through an N2 interface, with an AMF supporting the NB service. The AMF supporting the NB service may communicate, through an N26 interface, with an MME supporting a WB service. The AMF supporting the NB service may communicate with a UDM through an N8 interface. The MME supporting the WB service may communicate with an HSS through an S6a interface. A base station (for example, an eNB) supporting the WB service may communicate, through an S1-MME interface, with the MME supporting the WB service. Certainly, the terminal may further communicate, through an LTE Uu interface, with the base station supporting the WB service.

It should be noted that the MME supporting the WB service and the MME supporting the NB service may be located in one physical entity, or may be mutually independent physical entities.

In addition, the base station supporting the WB service and the base station supporting the NB service may be located in one physical entity, or may be mutually independent physical entities. This is not limited in the embodiments of the present disclosure.

In addition, the AMF supporting the WB service and the AMF supporting the NB service may be located in one physical entity, or may be mutually independent physical entities.

In addition, the HSS and the UDM in FIG. 3 and FIG. 4 may be located in one physical entity, or may be mutually independent physical entities.

In addition, the interfaces shown in FIG. 1 to FIG. 4 are only examples. This is not limited in the embodiments of the present disclosure.

Through the architectures shown in FIG. 1 to FIG. 4, the terminal can be switched from the NB service to the WB service, and from the WB service to the NB service. For example, wideband service fallback (wideband fallback) is implemented through an interface between a network (NW) node supporting the NB service and an NW node supporting the WB service. The terminal runs in an NB mode and is attached to the NW node supporting the NB service. Referring to the architectures shown in FIG. 1 to FIG. 4, the following manner may exist:

| WB service fallback | NW node supporting the NB service | NW node supporting the WB service | Interface |
| --- | --- | --- | --- |
| LTE NB→LTE WB | MME | MME | S10 |
| 5G NB→5G WB | AMF | AMF | N14 |
| LTE NB→5G WB | MME | AMF | N26 |
| 5G NB→LTE WB | AMF | MME | N26 |

It should be noted that the terminal may be user equipment (UE) or another terminal side device, for example, a terminal side device such as a mobile phone, a tablet personal computer, a laptop computer, a personal digital assistant (PDA), a mobile internet device (MID), a wearable device, or a robot. It should be noted that a specific type of the terminal is not limited in the embodiments of the present disclosure.

It should be noted that in the embodiments of the present disclosure, only 4G and 5G are used as examples for description.

Figure 5:
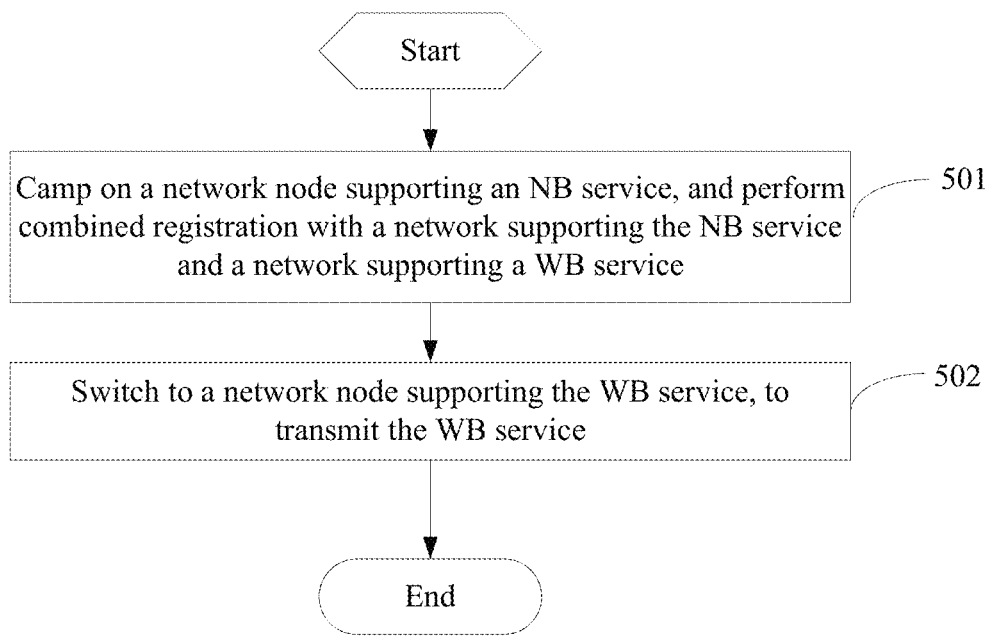
FIG. 5 is a flowchart of a registration switching method according to an embodiment of the present disclosure.

Referring to FIG. 5, FIG. 5 is a flowchart of a registration switching method according to an embodiment of the present disclosure, and the method is applied to a terminal supporting an NB capability and a WB capability. As shown in FIG. 5, the method includes the following steps: 501 and 502.

Step 501: Camp on a network node supporting an NB service, and perform combined registration with a network supporting the NB service and a network supporting a WB service.

The foregoing network node supporting the NB service (which may be referred to as an NB network node) may be a core network node supporting the NB service, for example, an MME or an AMF. The network supporting the NB service may be a network of the network node supporting the NB service, and the network supporting the WB service may be a network of a network node supporting the WB service. In addition, the network supporting the NB service and the network supporting the WB service may share or not share a same core network device, for example, share a same HSS or UDM.

In addition, in step 501, in a case that the terminal is camped on the network node supporting the NB service, combined registration with the network supporting the NB service and the network supporting the WB service may be implemented.

The performing combined registration with a network supporting the NB service and a network supporting a WB service may be: separately registering the terminal with the network supporting the NB service and the network supporting the WB service, so that the terminal can obtain both the NB service and the WB service.

In this embodiment of the present disclosure, the NB service and the WB service are two different services. Bandwidth occupied by the NB service is less than bandwidth occupied by the WB service. For example, the NB service may be an Internet of Things (IoT) service, and the WB service may be a wideband service. Further, the NB service may be an LTE CIoT service or a 5G CIoT service, and the WB service may be an LTE WB service or a 5G WB service.

It should be noted that, in this embodiment of the present disclosure, in a case that the terminal obtains the NB service, the terminal may operate in an NB mode. For example, when the LTE CIoT service is obtained, it may be referred to as an NB-S1 mode, and when the 5G CIoT service is obtained, it may be referred to as an NB-N1 mode. In a case that the terminal obtains the WB service, the terminal may operate in a WB mode. For example, when the LTE WB service is obtained, it may be referred to as a WB-S1 mode, and when the 5G WB service is obtained, it may be referred to as a WB-N1 mode.

Step 502: Switch to a network node supporting the WB service, to transmit the WB service.

The network node supporting the WB service (which may be referred to as a WB network node) may be a core network node supporting the WB service, for example, an MME or an AMF.

The switching to a network node supporting the WB service, to transmit the WB service may be: in a case that the terminal needs to obtain the WB service, switching to the network node supporting the WB service, to transmit the WB service. In addition, before switching to the network node supporting the WB service, the terminal may transmit the NB service.

The transmitting the WB service may be at least one of receiving the WB service and sending the WB service.

The switching to a network node supporting the WB service may be automatically initiated by the terminal, or may be initiated by a network side.

For example, the terminal operates in the NB mode at boot, registers with an NB network in the NB mode, and registers with a WB network through the NB network node, so that energy can be saved and the NB service (for example, an IoT service) can be obtained. When the terminal needs to transmit the WB service (for example, big data), the terminal instructs, by using NAS signaling (for example, an extended service request), the network to switch to the WB mode, the network assists the terminal in reselecting the WB network node, and the terminal switches to the WB mode to execute the WB service. After the WB service is completed, the terminal may return to the network node supporting the NB service, and return to the NB mode.

For another example, when a service in the WB mode on the network side needs to be transmitted to the terminal, the network node supporting the WB service notifies the network node supporting the NB service that downlink data needs to be transmitted, and the NB network performs paging (in an idle state) or notifies (in a connected state) the terminal. The terminal may respond to the network by using NAS signaling (for example, an extended service request), the network assists the terminal reselecting the network node supporting the WB, and the terminal switches to the WB mode to transmit the WB service. After the WB service is completed, the terminal may return to the network node supporting the NB service, and return to the NB mode.

It should be noted that in this embodiment of the present disclosure, the WB service and the NB service may be distinguished by using a slice, an access point name (APN), a data network name (DNN), or the like. This is not limited herein. In addition, through subscription, the terminal and the network may agree upon on which services are transmitted by using the WB and which services are transmitted by using the NB. That is, the WB service and the NB service may also be agreed upon by the terminal and the network through subscription. In addition, an application service and an operator may also agree upon on which services are transmitted by using the WB and which services are transmitted by using the NB, and an application server notifies an application layer of the terminal by using the application layer. That is, the WB service and the NB service may also be determined by the application server. A 5G system is used as an example. In the 5G system, the WB service and the NB service may be distinguished through interaction between an AF and a policy control function (PCF). For example, interaction between the AF and the PCF determines which services are transmitted by using the WB and which services are transmitted by using the NB, and the PCF notifies the terminal of a related policy.

In this embodiment of the present disclosure, the foregoing step may be performed to implement switching to the network node supporting the WB service, to transmit the WB service. In this way, the terminal can quickly switch to the WB mode on the basis of satisfying energy saving of the terminal, to perform high-rate data transmission, thereby improving service experience of a user.

In an optional implementation, the performing combined registration with a network supporting the NB service and a network supporting a WB service includes:

sending a first message to the network node supporting the NB service, where the first message instructs the terminal to support the WB service.

The first message may be a message used for registration. Because the first message instructs the terminal to support the WB service, the network node supporting the NB service can be triggered by using the message, and the terminal can perform combined registration with the network supporting the NB service and the network supporting the WB service. For example, the first message may include but is not limited to:

a mobility and periodic registration update procedure request, an attach request, an initial registration request, or a tracking area update (TAU) request.

In this way, combined registration with the network supporting the NB service and the network supporting the WB service can be implemented through a mobility and periodic registration update procedure, an attach procedure, an initial registration procedure, or a TAU procedure.

In addition, the first message may further include a combined registration indication, to complete combined registration more accurately. For example, the mobility and periodic registration update request may include a combined mobility and periodic registration update indication, or the attach request may include a combined attach indication, or the registration request may include a combined registration indication, or the TAU request may include a combined update indication.

Certainly, the first message may also not include a combined registration indication. For example, in this embodiment of the present disclosure, because the first message instructs the terminal to support the WB service, the attach request may be a combined attach request by default.

Optionally, after the sending a first message to the network node supporting the NB service, the method further includes:

receiving a response message of the first message from a network side of the NB service, where the response message includes at least one of the following:

an indication that the terminal successfully completes combined registration, an identifier of the network node supporting the WB service, and a tracking area identity (TAI) allocated to a WB system of the terminal.

The TAI of the WB system may be a TAI allocated to the terminal by the network node supporting the WB service.

In this implementation, because the response message includes at least one of the foregoing three items, the terminal may be assisted in quickly switching to the WB system to transmit the WB service. For example, if the network allocates a tracing area (for example, a TA corresponding to the foregoing TAI. In addition, the tracing area may also be referred to as a tracking area) to the foregoing terminal, that is, a TA that overlaps a target RAT's coverage area, a fallback procedure may be quicker, where a RAT herein represents a radio access technology, and the fallback procedure indicates a handover to the network node supporting the WB service, to transmit a WB service.

Figure 6:
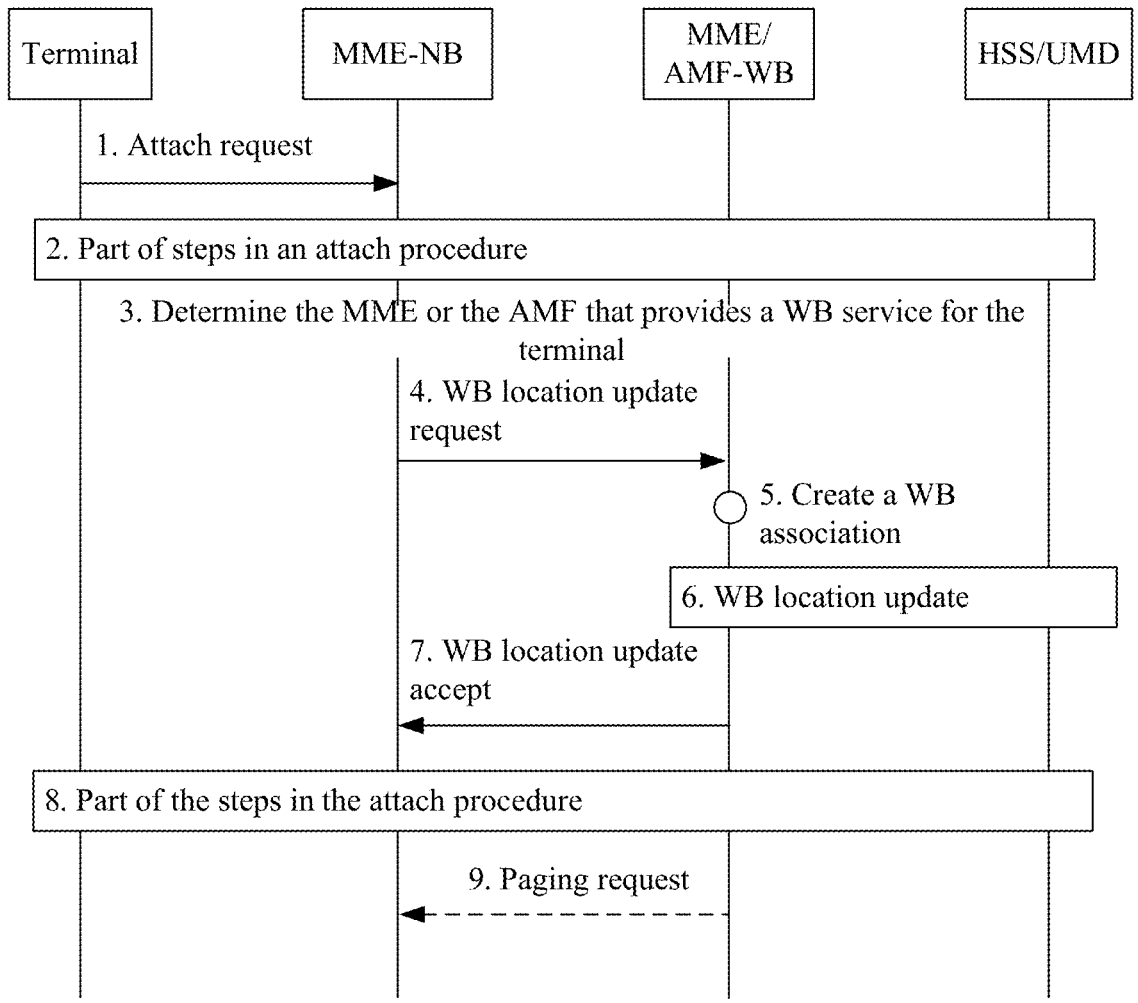
FIG. 6 to FIG. 12 are schematic example diagrams of a registration switching method according to an embodiment of the present disclosure.

The following uses FIG. 6 to describe an example in which the first message is an attach request.

Step 1: The terminal sends an attach request to an MME supporting the NB service (that is, an MME_NB).

The attach request may be used to trigger an LTE NB network node to register with an LTE WB network node, or may be used to trigger an LTE NB network node to register with a 5G WB network node. Specific implementation depends on the network.

In addition, in an attach request procedure, the terminal may indicate that an attach type is combined NB and WB attach (combined NB/WB attach), and the terminal notifies the network that the terminal can work in the WB mode (that is, can transmit the WB service). Further, the terminal in the attach request message may further provide a 5G NAS capability of the terminal.

Step 2: Perform an attach procedure.

For the attach procedure, refer to an attach procedure defined in a current protocol. Details are not described herein.

Step 3: The MME_NB selects, for the terminal based on a network configuration, an MME/AMF_WB that provides the WB service for the terminal. That is, in attach accept, the MME may select, based on whether to connect to the MME_WB (that is, an MME supporting the WB service) or the AMF_WB (that is, an AMF supporting the WB service), to initiate a registration procedure of the WB service to the MME_WB or the AMF_WB for the terminal.

Step 4: The MME_NB initiates a WB location update procedure to the MME/AMF_WB to provide an identifier of the terminal.

Further, a location update request of the location update procedure may further include at least one of the following:

a tracking area identity (TAI), an identifier of the network node supporting the NB service, a location update type, a PLMN identifier of the WB service, and capability indication information, where the capability indication information indicates that the terminal supports the WB service.

Step 5: After checking a subscription of the terminal, the MME/AMF_WB determines that the terminal obtains a subscription of the WB service, and then creates a WB service association (Create WB association). For example, a context is locally created for the terminal, and an association to an HSS/UDM is created.

Step 6: The MME/AMF_WB performs a WB location update procedure for the terminal, and instructs the HSS/UDM to provide the WB service for the terminal.

In step 5 and step 6, a prerequisite that after checking the subscription of the terminal, the MME/AMF_WB and the HSS/UDM determine that the terminal obtains the subscription of the WB service is implicitly included.

It should be noted that step 5 may also be used as a step of executing a WB location update procedure, that is, the executing a WB location update procedure may include creating the WB service association.

Step 7: The MME/AMF_WB returns a WB location update accept message to the MME_NB, where the message includes an identifier of the MME/AMF_WB.

Step 8: Perform an attach procedure.

Similarly, for the attach procedure, refer to an attach procedure defined in a current protocol. Details are not described herein.

Figure 7:
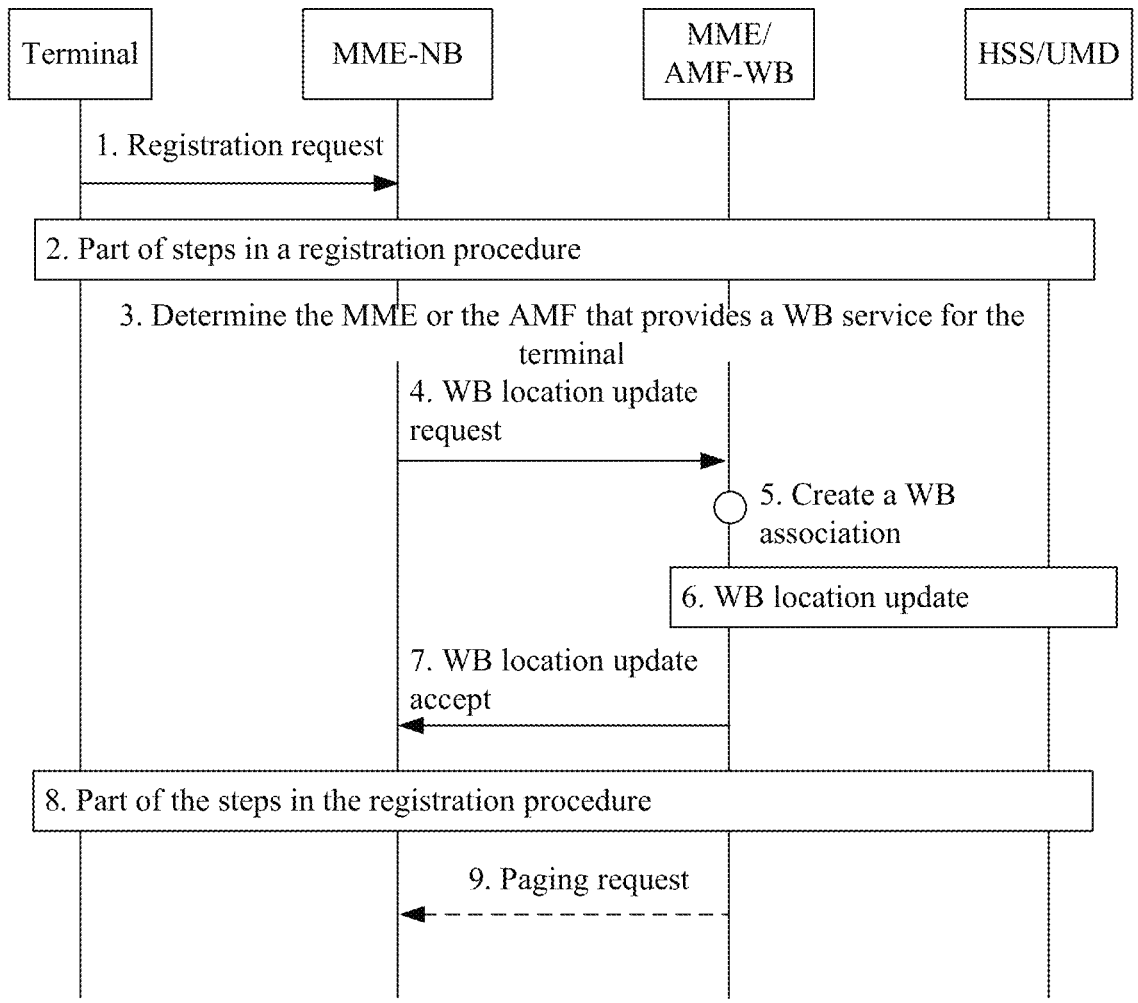

The following uses FIG. 7 to describe an example in which the first message is a registration request.

Step 1: The terminal sends a registration request to an AMF supporting the NB service (that is, an AMF_NB).

The registration request may be an initial registration request.

In addition, the registration request may be registering the AMF_NB with a 5G WB, that is, an AMF_WB, or may be registering the AMF_NB with an LTE WB, that is, an MME_WB.

In addition, in a registration request procedure, the terminal may indicate that an attach type is combined NB and WB registration (combined NB/WB registration), and the terminal notifies the network that the terminal can work in the WB mode (that is, can accept the WB service). Further, the terminal in the registration request message may further provide a 4G NAS capability of the terminal.

In addition, the AMF in a registration accept message may provide different indications for the terminal based on whether the AMF is connected to the MME_WB (that is, the MME supporting the WB service) or the AMF_WB (that is, the AMF supporting the WB service).

For step 2 to step 9, refer to the corresponding descriptions shown in FIG. 6. Details are not described herein again.

Figure 8:
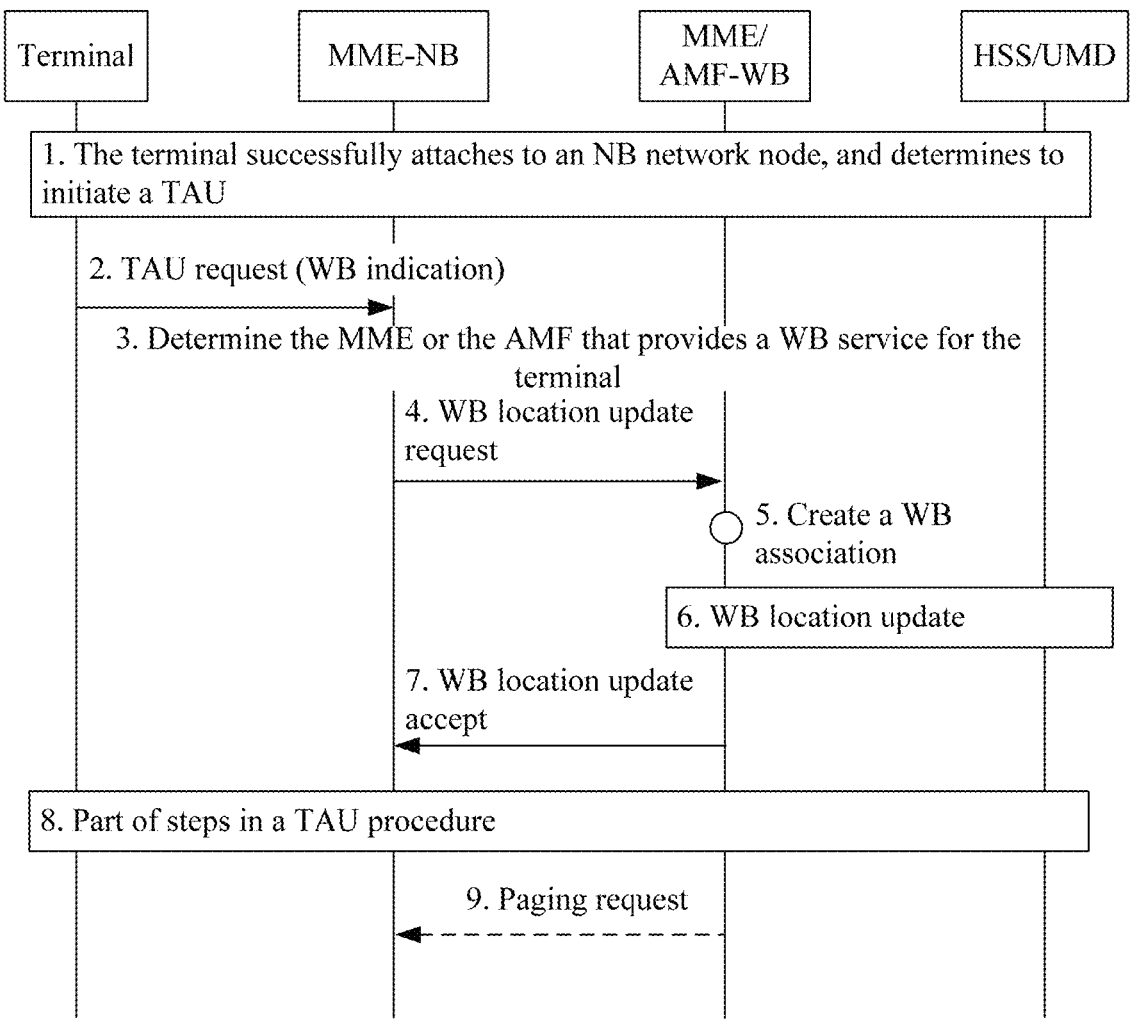

The following uses FIG. 8 to describe an example in which the first message is a TAU request.

This procedure may be applied to the terminal that is previously successfully attached to a network node MME NB supporting an LTE NB service. In this procedure, the terminal requests, from the network, to register with the network node supporting the WB service, and the network node MME NB is the network node that supports the WB service and with which the terminal is registered.

As shown in FIG. 8, the following steps are included.

Step 1: The terminal successfully attaches to an NB network node MME NB, and determines to initiate a TAU.

Step 2: The terminal sends a TAU request to an MME supporting the NB service (that is, an MME_NB).

The TAU request may include a WB indication.

In addition, in a TAU request procedure, the terminal may indicate that an attach type is combined NB and WB TAU (combined NB/WB TAU), and the terminal notifies the network that the terminal can work in the WB mode (that is, can accept the WB service). Further, the terminal in the TAU request message may further provide a 5G NAS capability of the terminal.

In addition, the MME in a TAU accept message may provide different indications for the terminal based on whether the MME is connected to the MME_WB (that is, the MME supporting the WB service) or the AMF_WB (that is, the AMF supporting the WB service).

In addition, for step 3 to step 9, refer to the corresponding descriptions shown in FIG. 6. Details are not described herein again.

It should be noted that in the foregoing embodiment of the present disclosure, the terminal may further perform a de-attach procedure or a de-register procedure. In the de-attach procedure or the de-register procedure, the terminal instructs, after determining that the WB service is no longer required, the network to no longer obtain the WB service, and the NB network side instructs the WB network node to delete a parameter and a context that are associated with the WB service. Certainly, the terminal may still be normally attached to the NB network node to obtain the NB service.

In addition, the de-attach procedure or the de-register procedure may also be initiated by the network. For example, after the WB subscription of the terminal becomes invalid, the WB network initiates the procedure, instructs, by using the NB network node, the UE to no longer obtain the WB service, and the WB network side deletes the parameter and the context that are associated with the WB service. Certainly, the terminal may still be normally attached to the NB network node to obtain the NB service.

In an optional implementation, before the switching to a network node supporting the wideband WB service, to transmit the WB service, the method further includes:

sending a second message to the network node supporting the NB service, where the second message is used to request the WB service.

The second message may be a message that is sent to request the WB service when the terminal needs to transmit the WB service, so that the terminal can request the WB service by using the second message in a timely manner.

Optionally, the second message may include:

an extended service request (extended SR).

Certainly, in this embodiment of the present disclosure, the second message is not certainly an extended service request, for example, may be another service request used to request the WB service.

Optionally, after the sending a second message to the network node supporting the NB service, the method further includes:

sending a suspend request to the network node supporting the NB service, where the suspend request is used to request to suspend the NB service.

In this implementation, because the suspend request is sent, the network node supporting the NB service can be prevented from continuing to send the NB service to the terminal after the terminal switches to the network node supporting the WB service, to avoid a resource waste.

Optionally, the switching to a network node supporting the wideband WB service, to transmit the WB service includes:

sending, to the network node supporting the WB service, the extended service request that is used to obtain the WB service; and initiating a connection create procedure of the WB service to the network node supporting the WB service, to transmit the WB service.

The connection create procedure may be a packet data network (PDN) connection create procedure or a PDU session create procedure.

In this implementation, the UE quickly switches to the network node supporting the WB service and creates a connection, to efficiently transmit the WB service.

Optionally, before the sending, to the network node supporting the WB service, the extended service request that is used to obtain the WB service, the methods further includes:

if a cell supporting the WB service does not belong to a tracking area corresponding to the TAI that is of the WB system and that is received by the terminal, initiating an update procedure to the network node supporting the WB service.

The update procedure may be a registration update procedure, or the update procedure may be a TAU procedure.

In this implementation, in a case that the cell supporting the WB service does not belong to the tracking area corresponding to the TAI that is of the WB system and that is received by the terminal, the update procedure to the network node supporting the WB service may be initiated, to quickly establish a connection to the network node supporting the WB service and transmit the WB service.

Figure 9:
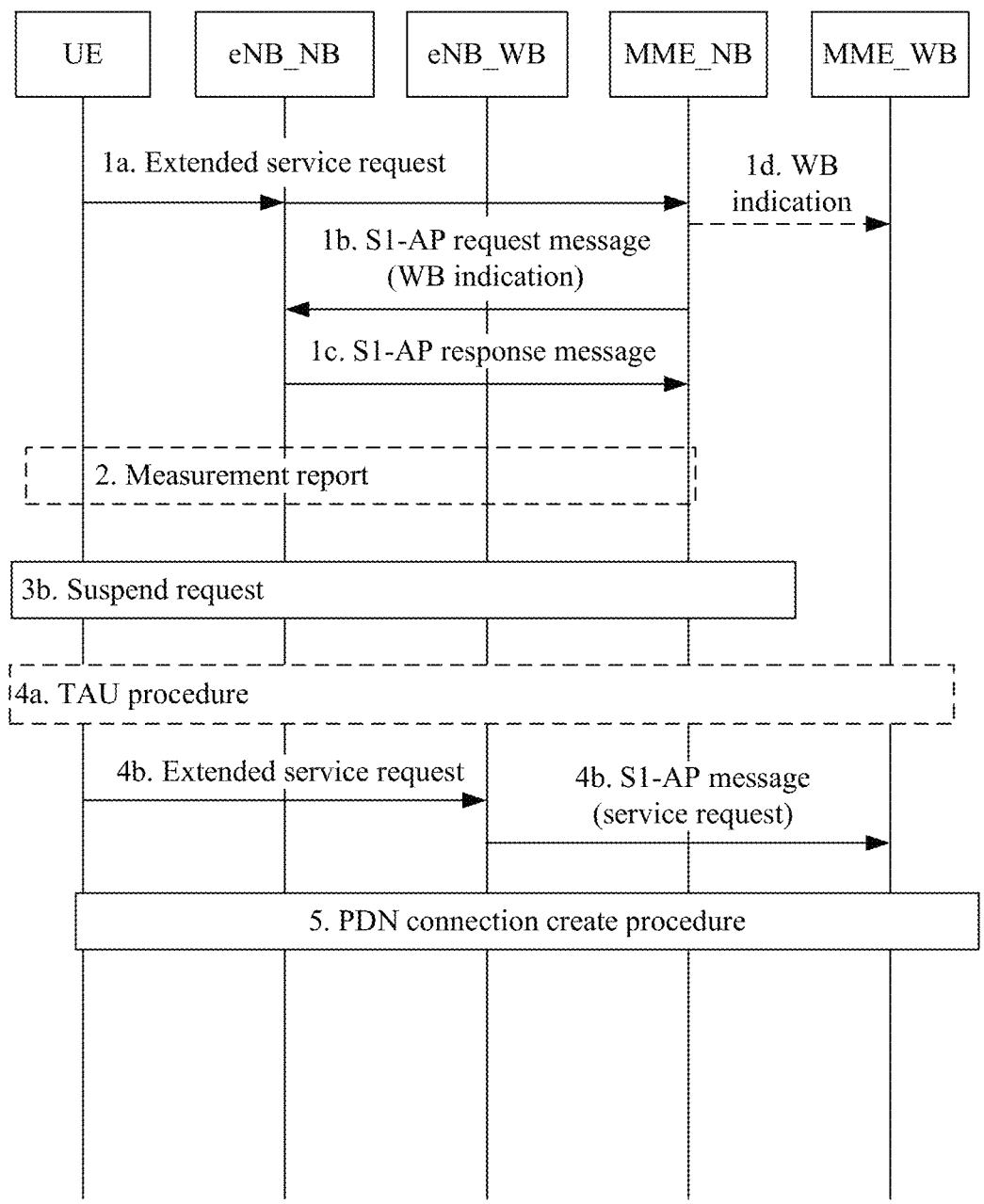

The following uses FIG. 9 to describe an example in which the second message is an extended service request.

Step 1a: The terminal sends an extended service request to an MME_NB to request the WB service.

The extended service request message may be encapsulated in an RRC and S1 interface application protocol (S1 Application Protocol, S1-AP) message.

In addition, after registering with a WB domain, the terminal may send the extended service request message, that is, after registering with the network node supporting the WB service, the terminal sends the extended service request message.

Step 3b: The terminal may initiate a suspend procedure for a PDN connection in the NB mode, that is, send a suspend request.

Step 4a: If a TA to which a new cell belongs does not belong to a TA list received by the terminal during a previous attach or/TAU procedure, the terminal may initiate a TAU procedure to an MME_WB.

Step 4b: The terminal sends an extended service request to the MME_WB, to indicate to the MME-WB that the UE moves from the NB node to obtain the WB service.

Step 5: The terminal initiates a PDN connection create procedure required by the WB service, carries an APN corresponding to the WB service, and transmits the WB service.

In an optional implementation, before the switching to a network node supporting the wideband WB service, to transmit the WB service, the method further includes:

receiving a third message sent by the network node supporting the NB service, where the third message is used to indicate that downlink data of the WB service is to be sent.

The third message may be a third message sent by the network node supporting the NB service by using an access network node supporting the NB service. After receiving the third message, the terminal may switch to the network node supporting the wideband WB service, so that before transmitting the WB service, the terminal can be notified, by using the third message, that there is a downlink WB service.

Optionally, in a case that the terminal is in an idle state, the third message includes a paging message, and the paging message carries a WB indication; or in a case that the terminal is in a connected state, the third message includes a non-access stratum (NAS) notification message, and the NAS notification message carries a WB indication.

In this implementation, the paging message may be delivered to the terminal in the idle state to indicate that the WB service is to be transmitted, and the NAS notification message may be delivered to the terminal in the connected state to indicate that the WB service is to be transmitted.

Optionally, before the switching to a network node supporting the wideband WB service, to transmit the WB service, the method further includes:

sending an extended service request to the network node supporting the NB service, where the extended service request is used to request the WB service.

After the extended service request is sent to the network node supporting the NB service, the network node supporting the NB service sends, to the network node supporting the WB service, a service request used to request the WB service, so that the terminal transmits the WB service to the network node supporting the WB service. The WB service may be transmitted by using a connection (for example, a PDN connection) that is required by the WB service and that is created by the terminal in the WB domain, and the connection may be a connection created between the terminal and the network node supporting the WB service after the extended service request is sent to the network node supporting the NB service. For example, after the extended service request is sent to the network node supporting the NB service, the extended service request that is used to obtain the WB service is sent to the network node supporting the WB service; and the connection create procedure of the WB service is initiated to the network node supporting the WB service, to transmit the WB service. Alternatively, the connection may be a connection created between the terminal and the network node supporting the WB service before the extended service request is sent to the network node supporting the NB service. This is not limited herein.

Similarly, after the receiving a third message sent by the network node supporting the NB service, the method further includes:

sending a suspend request to the network node supporting the NB service, where the suspend request is used to request to suspend the NB service.

For the suspend request, refer to the corresponding description of the foregoing implementation. Details are not described herein again.

Figure 10:
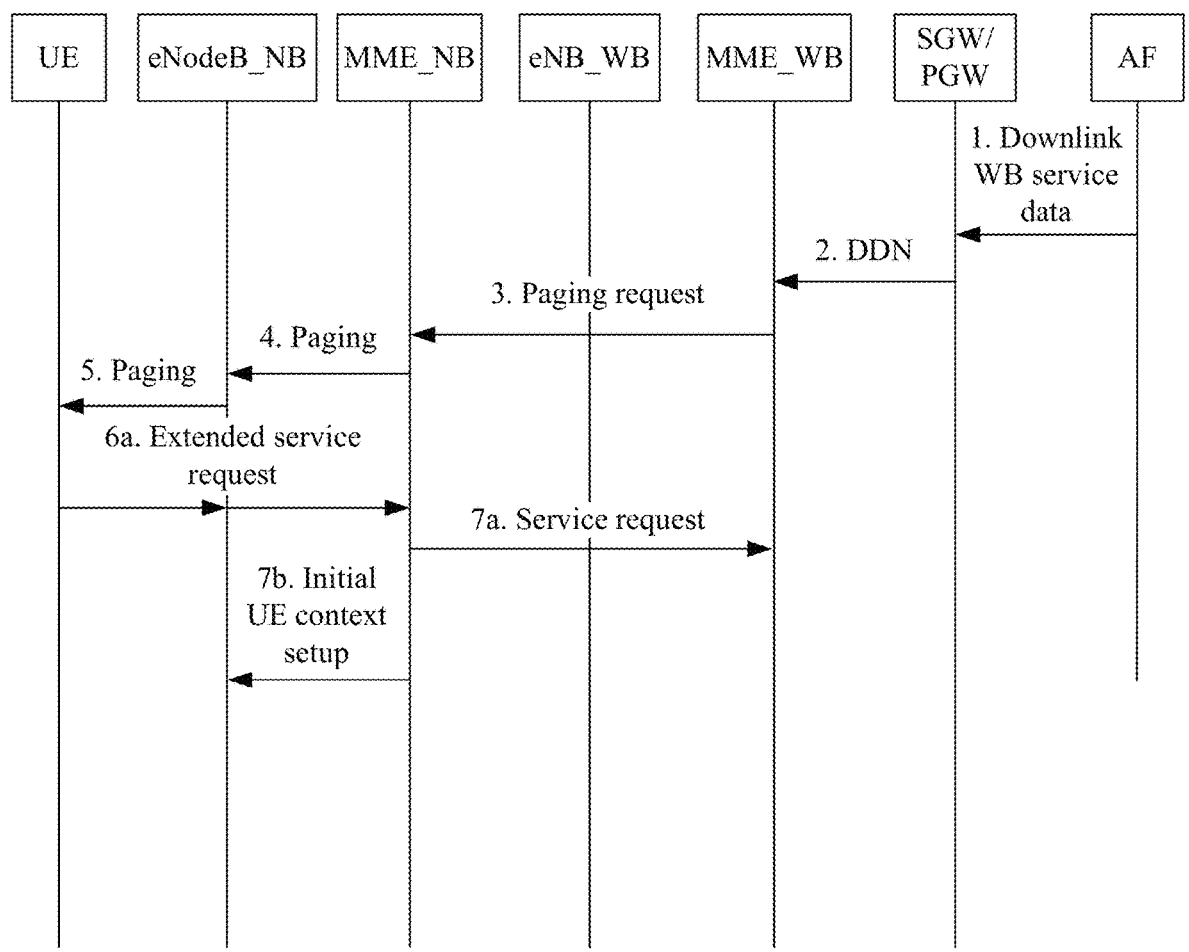

The following uses FIG. 10 to describe an example in which the third message is a paging message.

A prerequisite for the example shown in FIG. 10 is that the terminal creates, in the WB domain, the PDN connection required by the WB service.

As shown in FIG. 10, the following steps are included.

Step 1: An AF needs to send WB service data to UE, and the AF sends data to a packet data gateway (PDN Gateway, PGW)/a serving gateway (serving GW, SGW) corresponding to a PDN connection.

Step 2: The terminal is in an idle state in a WB, and the PGW/SGW sends a downlink data notification (DDN) to an MME_WB.

Step 3: The MME_WB sends a paging request to an MME_NB.

Step 4: When the terminal is in an idle state in an NB, the MME_NB sends a paging request to an eNB_NB, where the paging message carries a WB indication.

Step 5: The eNB_NB sends the paging request to the terminal, where the paging message carries the WB indication.

Step 6a: The terminal sends an extended service request to the MME_NB to request the WB service.

Step 7a: The MME_NB responds to the MME_WB.

Step 7b: The MME_NB sends an initial UE context setup message to the eNB_NB. For this step, refer to step 1b shown in FIG. 9. Details are not described herein again.

Figure 11:
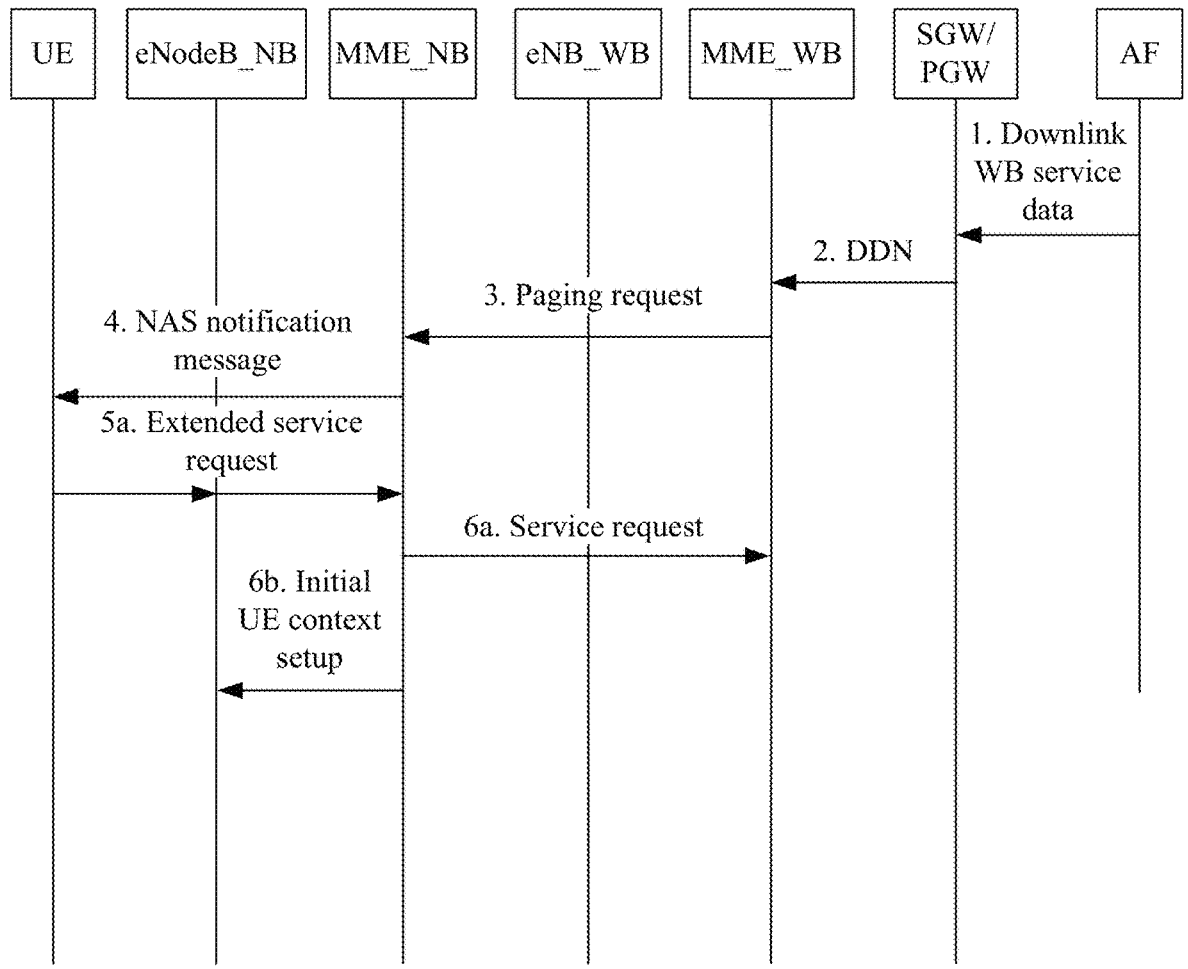

The following uses FIG. 11 to describe an example in which the third message is a NAS notification message.

For step 1 to step 3, refer to step 1 to step 3 in FIG. 10. Details are not described herein again.

Step 4: When the terminal is in a connected state in an NB, the MME_NB sends a NAS notification message to the terminal, where the notification message carries a WB indication.

Step 5a: The terminal sends an extended service request to the MME_NB to request the WB service.

Step 6a: The MME_NB responds to the MME_WB.

Step 6b: The MME_NB sends an initial UE context setup message to the eNB_NB. For this step, refer to step 1b shown in FIG. 9. Details are not described herein again.

In an optional implementation, after the switching to a network node supporting the WB service, the method further includes:

switching to the network node supporting the NB service.

The switching to the network node supporting the NB service may be: after the WB service of the terminal is completed, switching to the network node supporting the NB service, to transmit the NB service. In this way, switching from the NB to the WB can be implemented, and then switching to the NB can be performed.

Figure 12:
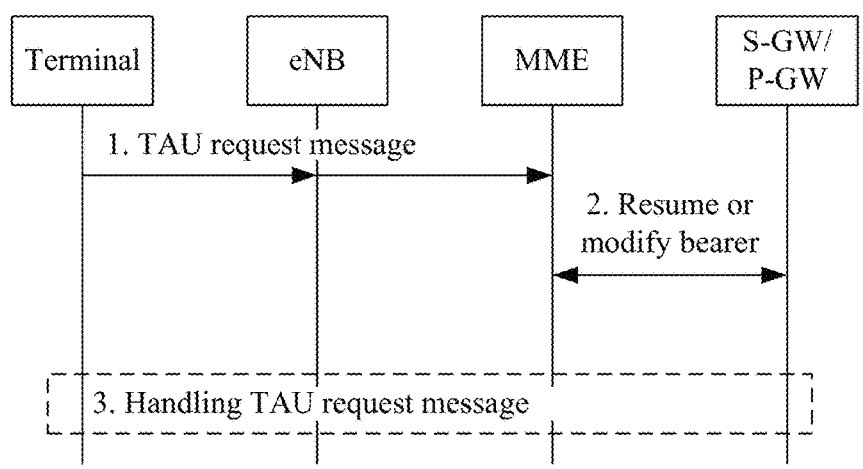

The following uses FIG. 12 as an example for description.

Step 1: The terminal sends a TAU request message to an MME.

Step 2: The MME and a PGW/SGW resumes or modifies a bearer (Resume/Modify Bearers).

Step 3: Handle the TAU request message (Handling TAU Request message).

In the foregoing procedure, the terminal switches back to the network node supporting the NB service.

Optionally, before the switching to the network node supporting the NB service, the method further includes:

receiving, from a network side of the WB service, information about a PLMN with which the terminal is registered last time.

The receiving, from a network side of the WB service, information about a PLMN with which the terminal is registered last time may be receiving, by the terminal, the information that is about the PLMN with which the terminal is registered last time and that is sent by an access network node supporting the WB service. The information about the PLMN with which the terminal is registered last time may be information about a PLMN with which the terminal is registered last time and that supports the NB service, that is, information about a PLMN with which the terminal is registered last time and that supports the NB service before being switched to the network node supporting the WB service. In addition, the information about the PLMN may be included in an identifier of a cell.

In addition, the information may be information about a PLMN with which the terminal is registered last time and that is received during RRC connection release. For example, during the RRC connection release, the MME_WB should indicate to the eNB_WB that an RRC connection is created due to a WB fallback. The eNB_WB may use the indication to notify the terminal of an identifier of an NB network that is registered with last time.

In this implementation, the information about the PLMN with which the terminal is registered last time is received from the network side of the WB service, so that the terminal can quickly switch back to the NB network.

In this embodiment of the present disclosure, the terminal camps on the network node supporting the NB service, and implements combined registration with the network supporting the NB service and the network supporting the WB service; and switches to the network node supporting the WB service, to transmit the WB service. In this way, the terminal can switch from the network node supporting the NB service to the network node supporting the WB service, to obtain the WB service, so that the terminal quickly switches to a WB mode on the basis of satisfying energy saving of the terminal, to perform high-rate data transmission, thereby improving service experience of a user.

Figure 13:
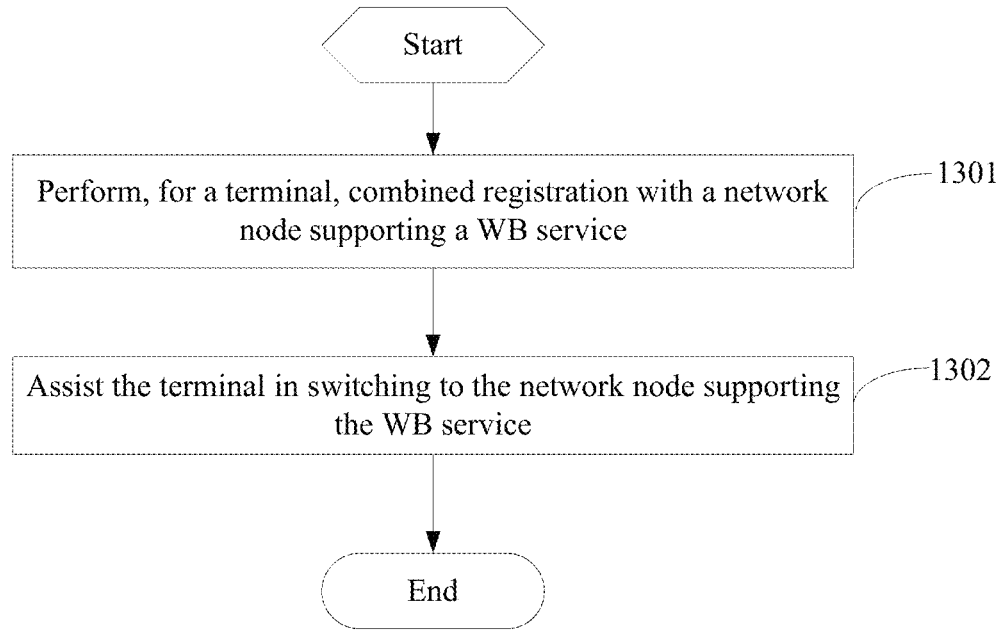
FIG. 13 is a flowchart of another registration switching method according to an embodiment of the present disclosure.

Referring to FIG. 13, FIG. 13 is a flowchart of another registration switching method according to an embodiment of the present disclosure, and the method is applied to a network node supporting an NB service. As shown in FIG. 13, the method includes the following steps: 1301 and 1302.

Step 1301: Perform, for a terminal, combined registration with a network node supporting a WB service.

The performing, for a terminal, combined registration with a network node supporting a WB service may be: in a case that the terminal camps on the network node supporting the NB service, performing, for the terminal, combined registration with the network node supporting the WB service. In addition, the combined registration herein may be combined registration with a network supporting the NB service and a network supporting the WB service.

Step 1302: Assist the terminal in switching to the network node supporting the WB service.

In addition, the assisting the terminal in switching to the network node supporting the WB service may be: providing information for the terminal to switch to the network node supporting the WB service, for example, notifying a WB network node that the terminal requests the WB service, releasing a connection to the terminal, and performing other processing that can assist the terminal in switching to the network node supporting the WB service.

In this embodiment, in the foregoing steps, combined registration with the network node supporting the WB service can be implemented for the terminal, and the terminal is assisted in quickly switching to the network node supporting the WB service, thereby improving service experience of a user.

In an optional implementation, the performing, for a terminal, combined registration with a network node supporting a WB service includes:

receiving a first message sent by the terminal, where the first message instructs the terminal to support the WB service.

Optionally, the first message includes:

a mobility and periodic registration update procedure request, an attach request, an initial registration request, or a TAU request.

Optionally, the mobility and periodic registration update request includes a combined mobility and periodic registration update indication; or the attach request includes a combined attach indication; or the initial registration request includes a combined registration indication; or the TAU request includes a combined update indication.

For the first message, refer to the corresponding description in the embodiment shown in FIG. 5. Details are not described herein again.

In an optional implementation, the performing, for a terminal, combined registration with a network node supporting a WB service further includes:

selecting, for the terminal, the network node supporting the WB service.

The selecting, for the terminal, the network node supporting the WB service may be: selecting, for the terminal based on a network configuration, the network node supporting the WB service. A specific selection manner is not limited in this embodiment.

Optionally, the performing, for a terminal, combined registration with a network node supporting a WB service further includes:

sending a location update request to the network node supporting the WB service, where the location update request includes an identifier of the terminal.

The location update request is used to request the network node supporting the WB service to execute a location update procedure, to implement registration of the terminal with the network node supporting the WB service.

Further, the location update request may further include at least one of the following:

a TAI, an identifier of the network node supporting the NB service, a location update type, a PLMN identifier of the WB service, and capability indication information, where the capability indication information indicates that the terminal supports the WB service.

Because the location update request includes the foregoing information, it is convenient for the network node supporting the WB service to quickly execute the location update procedure, to improve efficiency.

Optionally, the performing, for a terminal, combined registration with a network node supporting a WB service further includes:

receiving a location update request response sent by the network node supporting the WB service, where the location update request response includes an identifier of the network node supporting the WB service.

The location update request response may indicate that the network node supporting the WB service has completed a location update.

Optionally, the performing, for a terminal, combined registration with a network node supporting a WB service further includes:

sending a response message of the first message to the terminal, where the response message includes at least one of the following:

an indication that the terminal successfully completes combined registration, an identifier of the network node supporting the WB service, and a TAI allocated to a WB system of the terminal.

For the response message of the first message, refer to the corresponding description in the embodiment shown in FIG. 5. Details are not described herein again.

In an optional implementation, before the assisting the terminal in switching to the network node supporting the WB service, the method further includes:

receiving a second message sent by the terminal, where the second message is used to request the WB service; or sending a third message to the terminal, where the third message is used to indicate that downlink data of the WB service is to be sent.

Optionally, the second message includes:

an extended service request.

Optionally, after the assisting the terminal in switching to the network node supporting the WB service, the method further includes:

receiving a suspend request sent by the terminal, where the suspend request is used to request to suspend the NB service.

For the second message, the third message, and the suspend request, refer to the corresponding description in the embodiment shown in FIG. 5. Details are not described herein again.

Optionally, after the receiving a second message sent by the terminal, the method further includes:

sending an indication message to the network node supporting the WB service, where the indication message is used to indicate that the extended service request sent by the terminal to the network node supporting the WB service is used to obtain the WB service.

The indication message may include a WB indication, to indicate that the extended service request sent by the terminal to the network node supporting the WB service is used to obtain the WB service. The indication message is used to indicate that the extended service request sent by the terminal to the network node supporting the WB service is used to obtain the WB service, so that the network node supporting the WB service quickly provides the WB service for the terminal after receiving the extended service request sent by the terminal.

Optionally, in a case that the terminal is in an idle state, the third message includes a paging message, and the paging message carries a WB indication; or in a case that the terminal is in a connected state, the third message includes a non-access stratum NAS notification message, and the NAS notification message carries a WB indication.

Further, before the sending a third message to the terminal, the method may further include:

receiving a fourth message sent by the network node supporting the WB service, where the fourth message is used to indicate that the downlink data of the WB service is to be sent by the terminal.

The fourth message may include a paging request.

In this implementation, the fourth message may be used to trigger sending of the third message, so as to send the third message to the terminal only in a case that the downlink data of the WB service is to be sent by the terminal.

Further, after the sending a third message to the terminal, the method may further include:

receiving an extended service request sent by the terminal, where the extended service request is used to request the WB service; and sending, to the network node supporting the WB service, a service request that is used to respond to the fourth message.

In this implementation, the service request responding to the fourth message notifies the network node supporting the WB service that the terminal has responded to the WB service on the network side.

In an optional implementation, the assisting the terminal in switching to the network node supporting the WB service includes:

sending a UE context modification request to an access network node supporting the NB service, where the UE context modification request carries a WB indication.

The UE context modification request may be used to indicate to the access network node that the terminal should be moved to an eNB_WB, to assist the terminal in switching to the network node supporting the WB service.

Optionally, the UE context modification request includes a TAI of a WB domain.

Further, the TAI of the WB domain may include a PLMN identifier of the WB domain.

Because the TAI of the WB domain is included, it is more convenient for the terminal to switch to the network node supporting the WB service.

Further, after the sending a UE context modification request to an access network node supporting the NB service, the method may further include:

receiving a UE context modification response sent by the access network node supporting the NB service.

The UE context modification response may indicate that the access network node has completed modification of a UE context.

For the foregoing implementation, refer to the example shown in FIG. 9.

Step 1*b*: An MME sends an S1-AP request message to an eNodeB NB, where the request message includes a WB indication, and the request message may be a UE context modification request. This message may indicate to the eNB that the terminal should be moved to the eNB_WB. The message may further include a TAI of a WB domain, and the TAI of the WB domain includes a PLMN ID.

Further, the MME may further provide another priority indication such as an emergency service for the eNB, for example, roaming and access restriction are not performed in an emergency service situation.

Step 1*c*: The eNodeB feeds back an S1-AP response, for example, a UE context modification response message.

Step 1d: If returning to an NB PLMN that is registered with last time after the WB service is completed is supported, the MME_NB may further send an indication message to the MME_WB to indicate that the extended service request message in step 4b is used to obtain the WB service, and the indication message may be a WB fallback (FB) indication.

Step 2: Optionally, the eNB_NB may further send a measurement report message (for example, Optional Measurement Report Solicitation) to UE, to determine a target eNB_WB. This step may be applicable to a packet switch (PS) handover. If the PS handover is not required, this step should be omitted. That is, in this embodiment of the present disclosure, the terminal may not perform the PS handover before transmitting the WB service.

In an optional implementation, after the assisting the terminal in switching to the network node supporting the WB service, the method further includes:
    providing the NB service for the terminal.
The providing the NB service for the terminal may be: after the terminal completes the WB service, switching the terminal to the network node supporting the NB service, to provide the NB service for the terminal.

It should be noted that this embodiment is used as an implementation of the network node side supporting the NB service corresponding to the embodiment shown in FIG. 5. For a specific implementation of this embodiment, refer to the related description of the embodiment shown in FIG. 5. To avoid repeated descriptions, details are not described again in this embodiment. In this embodiment, service experience of a user can also be improved.

Figure 14:
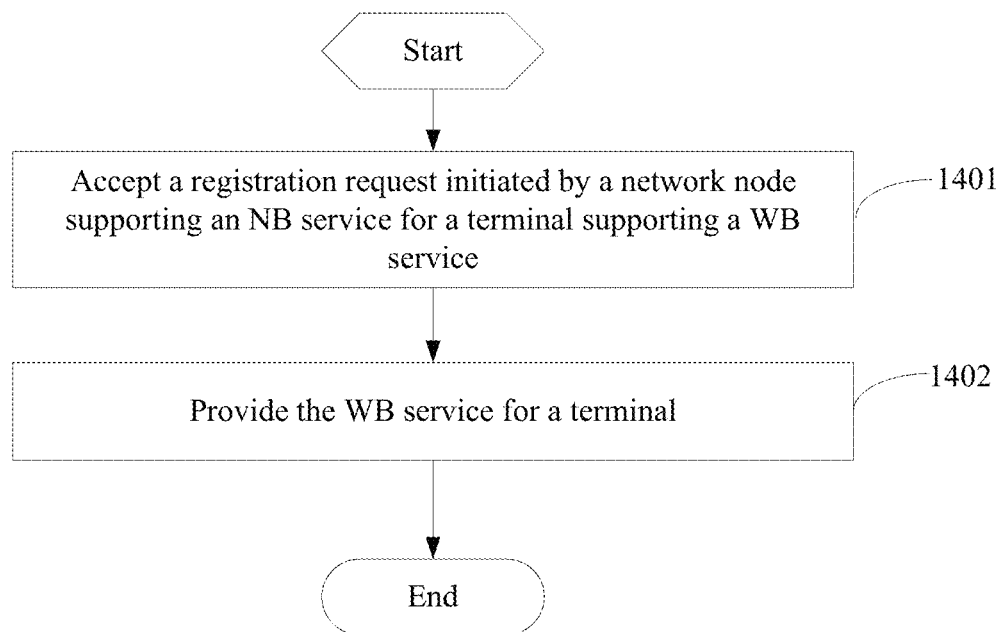
FIG. 14 is a flowchart of another registration switching method according to an embodiment of the present disclosure.

Referring to FIG. 14, FIG. 14 is a flowchart of a registration switching method according to an embodiment of the present disclosure, and the method is applied to a network node supporting a WB service. As shown in FIG. 14, the method includes the following steps: 1401 and 1402.

Step 1401: Accept a registration request initiated by a network node supporting an NB service for a terminal supporting the WB service.

The registration request initiated by the network node supporting the NB service for the terminal supporting the WB service may be a registration request initiated by the network node supporting the NB service in a process of performing, for the terminal, combined registration with the network node supporting the WB service.

Because the registration request is accepted in step 1401, the terminal can be registered with the network node supporting the WB service.

Step 1402: Provide the WB service for the terminal.

This step may be at least one of sending the WB service to the terminal and receiving the WB service sent by the terminal.

In this embodiment, the foregoing step may be performed to provide the WB service for the terminal, thereby improving service experience of a user.

In an optional implementation, the registration request includes a location update request, and the location update request includes an identifier of the terminal supporting the WB service.

Optionally, the location update request further includes at least one of the following:
    a TAI, an identifier of the network node supporting the NB service, a location update type, a PLMN identifier of the WB service, and capability indication information, where the capability indication information indicates that the terminal supports the WB service.

For the location update request, refer to the corresponding description in the embodiment shown in FIG. 13. Details are not described herein again.

Optionally, after the accepting a registration request initiated by a network node supporting an NB service for a terminal supporting the WB service, the method further includes:
    executing a location update procedure of the WB service of the terminal.
The location update procedure may be a location update procedure for providing the WB service for the terminal, and a specific process is not limited. For example, a location update procedure defined in a current protocol may be used to provide the WB service, or a location update procedure defined in a subsequent protocol version may be used to provide the WB service.

Optionally, the executing a location update procedure of the WB service of the terminal includes:
    determining whether the terminal obtains a subscription of the WB service; and executing the location update procedure of the WB service of the terminal if the terminal obtains the subscription of the WB service.

In this way, the location update procedure of the WB service of the terminal can be executed only in a case that the terminal obtains the subscription of the WB service, to save power and resources.

Optionally, the executing a location update procedure of the WB service of the terminal includes:
    creating a WB service association between the terminal and a subscription node, and notifying the subscription node to provide the WB service for the terminal.
The subscription node may be an HSS or a UMD.

In this implementation, the WB service association between the terminal and the subscription node is created, and the subscription node is notified to provide the WB service for the terminal, so that the subscription node can provide the WB service for the terminal.

Optionally, after the accepting a registration request initiated by a network node supporting an NB service for a terminal supporting the WB service, the method further includes:
    sending a location update request response to the network node supporting the NB service, where the location update request response includes an identifier of the network node supporting the WB service.

For the location update request response, refer to the corresponding description in the embodiment shown in FIG. 13. Details are not described herein again.

In an optional implementation, before the transmitting the WB service to the terminal, the method further includes:
    receiving an extended service request that is sent by the terminal and that is used to obtain the WB service; and
    executing a connection create procedure that is of the WB service and that is initiated by the terminal.

Optionally, before the receiving an extended service request that is sent by the terminal and that is used to obtain the WB service, the method further includes:
    receiving an indication message sent by the network node supporting the NB service, where the indication message is used to indicate that the extended service request sent by the terminal to the network node supporting the WB service is used to obtain the WB service.

For the extended service request, the connection create procedure, and the indication message, refer to the corresponding descriptions of the embodiments shown in FIG. 5 and FIG. 13. Details are not described herein again.

In an optional implementation, before the transmitting the WB service to the terminal, the method further includes:
sending a fourth message to the network node supporting the NB service, where the fourth message is used to indicate that downlink data of the WB service is to be sent by the terminal.

Optionally, the fourth message includes a paging request.

Optionally, after the sending a fourth message to the network node supporting the NB service, the method further includes:
receiving a service request that is sent by the network node supporting the NB service and that is used to respond to the fourth message.

For the fourth message and the service request, refer to the corresponding description in the embodiment shown in FIG. 13. Details are not described herein again.

In an optional implementation, after the providing the WB service for the terminal, the method further includes:
sending an indication message to an access network node supporting the WB service, where the indication message is used to instruct the access network node supporting the WB service to send information about a PLMN with which the terminal is registered last time.

For the information about the PLMN with which the terminal is registered last time, refer to the corresponding description in the embodiment shown in FIG. 5. Details are not described herein again.

It should be noted that this embodiment is used as an implementation of the network node side supporting the WB service corresponding to the embodiment shown in FIG. 5. For a specific implementation of this embodiment, refer to the related descriptions of the embodiment shown in FIG. 5. To avoid repeated descriptions, details are not described again in this embodiment. In this embodiment, service experience of a user can also be improved.

Figure 15:
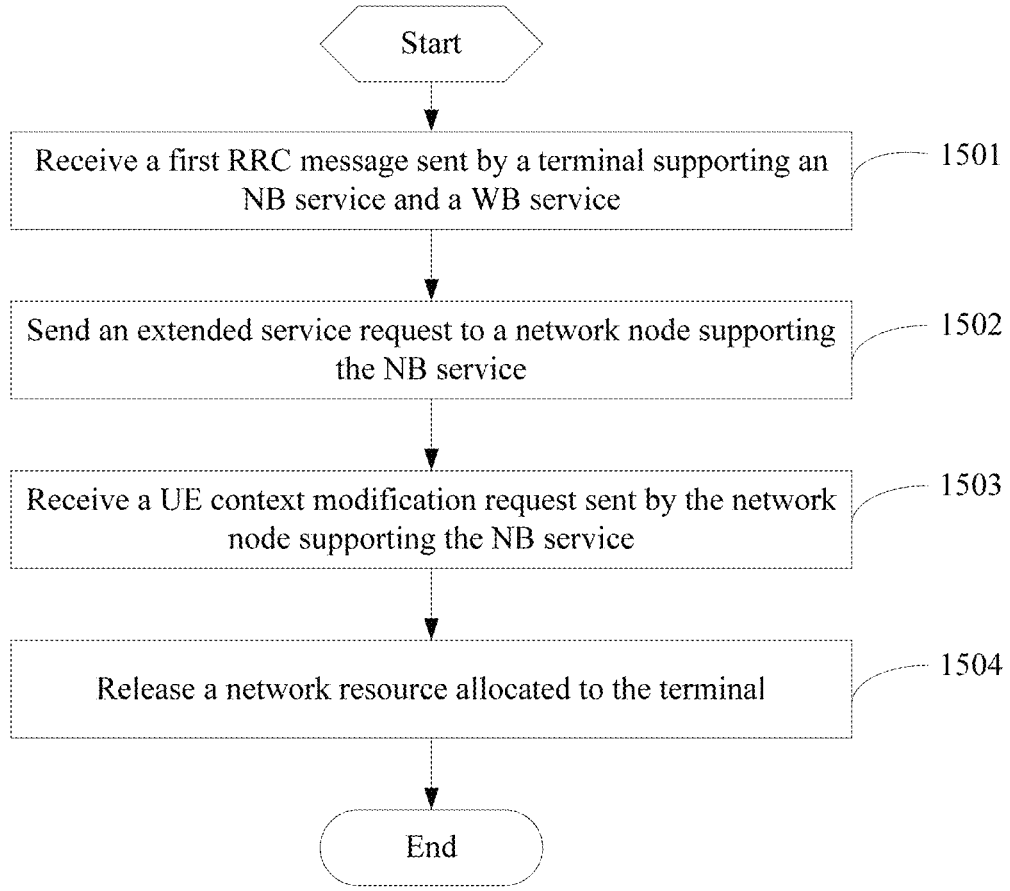
FIG. 15 is a flowchart of a request processing method according to an embodiment of the present disclosure.

Referring to FIG. 15, FIG. 15 is a flowchart of a request processing method according to an embodiment of the present disclosure, and the method is applied to an access network node supporting an NB service. As shown in FIG. 15, the method includes the following steps.

Step 1501: Receive a first radio resource control (RRC) message sent by a terminal supporting the NB service and a WB service, where a NAS message included in the first RRC message is an extended service request and is used to request the WB service.

Step 1502: Send the extended service request to a network node supporting the NB service.

Step 1503: Receive a UE context modification request sent by the network node supporting the NB service, where the UE context modification request carries a WB indication.

Step 1504: Release a network resource allocated to the terminal.

For the extended service request and the UE context modification request, refer to the corresponding description in the embodiment shown in FIG. 13. Details are not described herein again.

In this embodiment, the foregoing steps may be performed to assist the terminal in switching to the network node supporting the WB service, to improve service experience of a user. Further, after the UE context modification request is received, the network resource allocated to the terminal is released, thereby further reducing resource overheads.

Optionally, the UE context modification request further carries a TAI of a WB domain.

Optionally, the TAI of the WB domain includes a PLMN identifier of the WB domain.

Optionally, after the receiving a UE context modification request sent by the network node supporting the NB service, the method further includes:
sending a UE context modification response to the network node supporting the NB service.

For content carried in the UE context modification request and the context modification response, refer to the corresponding description of the embodiment shown in FIG. 13. Details are not described herein again.

Optionally, before the receiving an extended service request sent by the terminal supporting the WB service, the method further includes:
sending a target message to the terminal, where the target message is used to indicate that downlink data of the WB service is to be sent.

Optionally, in a case that the terminal is in an idle state, the target message includes a paging message, and the paging message carries a WB indication; or
in a case that the terminal is in a connected state, the target message is a second RRC message, the second RRC message includes a non-access stratum NAS notification message, and the NAS notification message carries a WB indication.

For the target message, refer to the corresponding description of the third message in the embodiment shown in FIG. 5. Details are not described herein again.

It should be noted that this embodiment is used as an implementation of the access network node side supporting the NB service corresponding to the embodiment shown in FIG. 5. For a specific implementation of this embodiment, refer to the related descriptions of the embodiment shown in FIG. 5. To avoid repeated descriptions, details are not described again in this embodiment. In this embodiment, service experience of a user can also be improved.

Figure 16:
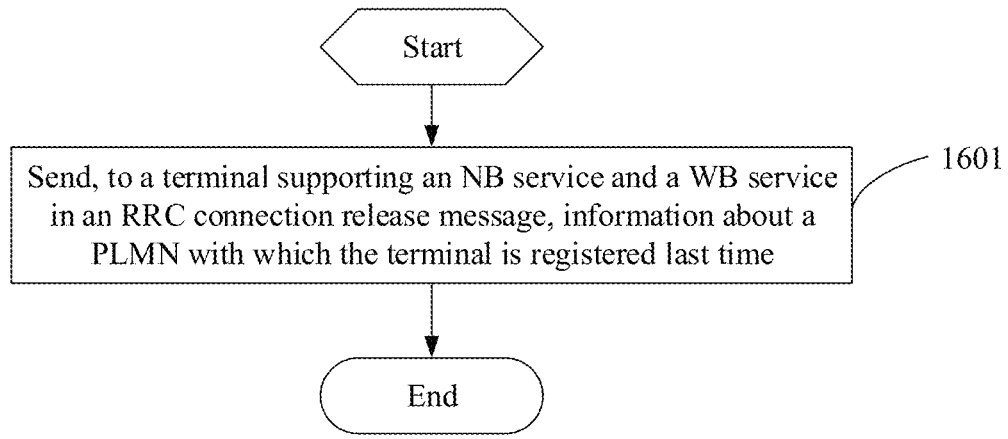
FIG. 16 is a flowchart of an information sending method according to an embodiment of the present disclosure.

Referring to FIG. 16, FIG. 16 is a flowchart of an information sending method according to an embodiment of the present disclosure, and the method is applied to an access network node supporting a WB service. As shown in FIG. 16, the method includes the following steps.

Step 1601: Send, to a terminal supporting an NB service and the WB service in an RRC connection release message, information about a PLMN with which the terminal is registered last time.

For the information about the PLMN with which the terminal is registered last time, refer to the corresponding description in the embodiment shown in FIG. 5. Details are not described herein again.

Optionally, an RRC connection is created by the terminal to send a NAS message to transmit the WB service, and the NAS message is an extended service request.

For the extended service request, refer to the corresponding description in the embodiment shown in FIG. 5. Details are not described herein again.

Optionally, before the sending, to a terminal supporting the WB service, information about a PLMN with which the terminal is registered last time, the method further includes:
receiving an indication message sent by a network node supporting the WB service, where the indication message is used to instruct to send, to the terminal, the information about the PLMN with which the terminal is registered last time.

For the indication message, refer to the corresponding description in the embodiment shown in FIG. 14. Details are not described herein again.

It should be noted that this embodiment is used as an implementation of the access network node side supporting the WB service corresponding to the embodiment shown in FIG. 5. For a specific implementation of this embodiment, refer to the related descriptions of the embodiment shown in FIG. 5. To avoid repeated descriptions, details are not described again in this embodiment. In this embodiment, service experience of a user can also be improved.

Figure 17:
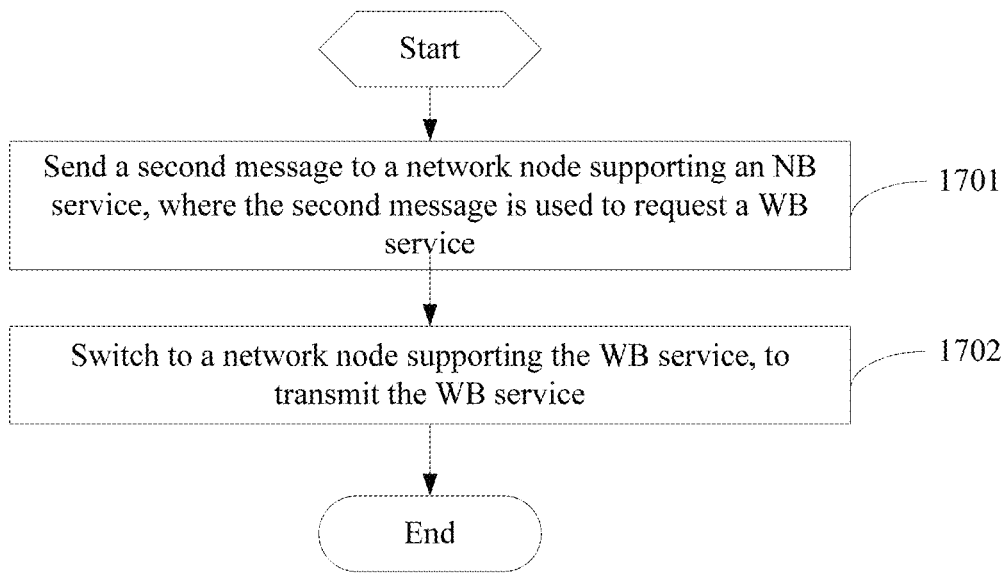
FIG. 17 to FIG. 20 are flowcharts of a service transmission method according to an embodiment of the present disclosure.

Referring to FIG. 17, FIG. 17 is a flowchart of a service transmission method according to an embodiment of the present disclosure, and the method is applied to a terminal supporting an NB capability and a WB capability. As shown in FIG. 17, the method includes the following steps.

Step 1701: Send a second message to a network node supporting an NB service, where the second message is used to request a WB service.

Step 1702: Switch to a network node supporting the WB service, to transmit the WB service.

In this embodiment, through the foregoing steps, the terminal may actively request to transmit the WB service. It should be noted that the terminal in this embodiment may be registered, in advance, with the network node supporting the WB service, or may be registered, in the manner shown in FIG. 5, with the network node supporting the WB service.

Optionally, the second message includes:
an extended service request.

Optionally, the switching to a network node supporting the wideband WB service, to transmit the WB service includes:
  sending, to the network node supporting the WB service, the extended service request that is used to obtain the WB service; and
  initiating a connection create procedure of the WB service to the network node supporting the WB service, to transmit the WB service.

Optionally, before the sending, to the network node supporting the WB service, the extended service request that is used to obtain the WB service, the methods further includes:
  if a cell supporting the WB service does not belong to a tracking area corresponding to a tracking area identifier TAI that is of a WB system and that is received by the terminal, initiating an update procedure to the network node supporting the WB service.

Optionally, the update procedure is a registration update procedure, or the update procedure is a TAU procedure.

Optionally, after the sending a second message to a network node supporting an NB service, the method further includes:
  sending a suspend request to the network node supporting the NB service, where the suspend request is used to request to suspend the NB service.

It should be noted that for description of related steps in this embodiment, refer to the embodiment shown in FIG. 5. Details are not described herein. In this way, service experience of a user can be improved.

Figure 18:
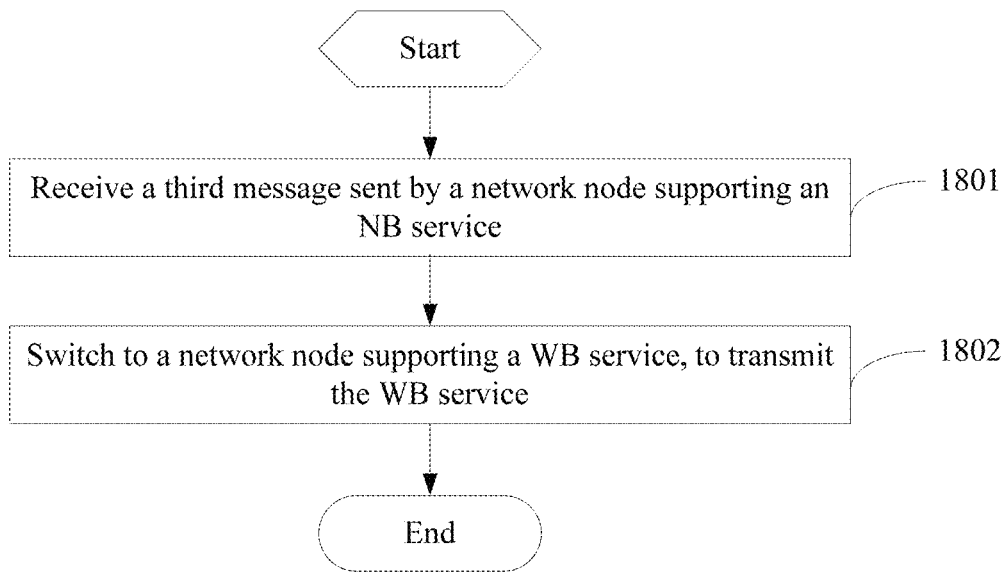

Referring to FIG. 18, FIG. 18 is a flowchart of another service transmission method according to an embodiment of the present disclosure, and the method is applied to a terminal supporting an NB capability and a WB capability. As shown in FIG. 18, the method includes the following steps.

Step 1801: Receive a third message sent by a network node supporting an NB service, where the third message is used to indicate that downlink data of a WB service is to be sent.

Step 1802: Switch to a network node supporting the WB service, to transmit the WB service.

In this embodiment, through the foregoing steps, the network side may actively request to transmit the WB service. It should be noted that the terminal in this embodiment may be registered, in advance, with the network node supporting the WB service, or may be registered, in the manner shown in FIG. 5, with the network node supporting the WB service.

Optionally, in a case that the terminal is in an idle state, the third message includes a paging message, and the paging message carries a WB indication; or
  in a case that the terminal is in a connected state, the third message includes a non-access stratum NAS notification message, and the NAS notification message carries a WB indication.

Optionally, before the switching to a network node supporting the wideband WB service, to transmit the WB service, the method further includes:
  sending an extended service request to the network node supporting the NB service, where the extended service request is used to request the WB service.

Optionally, after the receiving a third message sent by a network node supporting an NB service, the method further includes:
  sending a suspend request to the network node supporting the NB service, where the suspend request is used to request to suspend the NB service.

It should be noted that for description of related steps in this embodiment, refer to the embodiment shown in FIG. 5. Details are not described herein. In this way, service experience of a user can be improved.

Figure 19:
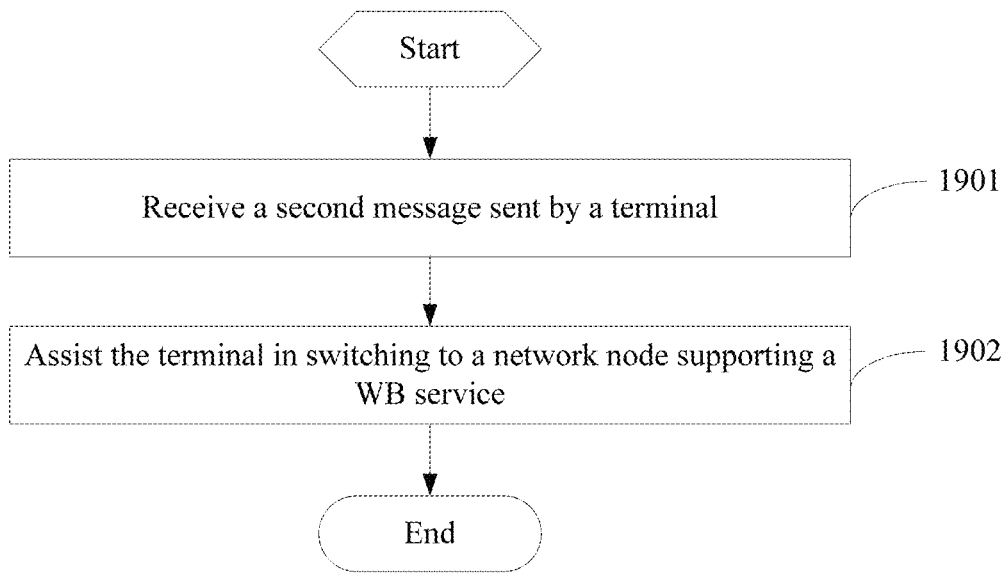

Referring to FIG. 19, FIG. 19 is a flowchart of another service transmission method according to an embodiment of the present disclosure, and the method is applied to a network node supporting an NB service. As shown in FIG. 19, the method includes the following steps.

Step 1901: Receive a second message sent by a terminal, where the second message is used to request a WB service.

Step 1902: Assist the terminal in switching to a network node supporting the WB service.

It should be noted that for the assisting the terminal in switching to a network node supporting the WB service, refer to the corresponding description in the foregoing embodiment. Details are not described herein again.

Optionally, the second message includes:
an extended service request.

Optionally, after the assisting the terminal in switching to a network node supporting the WB service, the method further includes:
  receiving a suspend request sent by the terminal, where the suspend request is used to request to suspend the NB service.

Optionally, after the receiving a second message sent by a terminal, the method further includes:
  sending an indication message to the network node supporting the WB service, where the indication message is used to indicate that the extended service request sent by the terminal to the network node supporting the WB service is used to obtain the WB service.

It should be noted that in this embodiment, step 1901 is replaceable, for example, is replaced with the following:
  sending a third message to a terminal, where the third message is used to indicate that downlink data of a WB service is to be sent.

Optionally, in a case that the terminal is in an idle state, the third message includes a paging message, and the paging message carries a WB indication; or in a case that the terminal is in a connected state, the third message includes a non-access stratum NAS notification message, and the NAS notification message carries a WB indication.

Optionally, before the sending a third message to a terminal, the method further includes:

receiving a fourth message sent by the network node supporting the WB service, where the fourth message is used to indicate that the downlink data of the WB service is to be sent by the terminal.

Optionally, the fourth message includes a paging request.

Optionally, after the sending a third message to a terminal, the method further includes:

receiving an extended service request sent by the terminal, where the extended service request is used to request the WB service; and sending, to the network node supporting the WB service, a service request that is used to respond to the fourth message.

Optionally, after the assisting the terminal in switching to a network node supporting the WB service, the method further includes:

providing the NB service for the terminal.

It should be noted that for description of related steps in this embodiment, refer to the embodiment shown in FIG. 13. Details are not described herein. In this way, service experience of a user can be improved.

Figure 20:
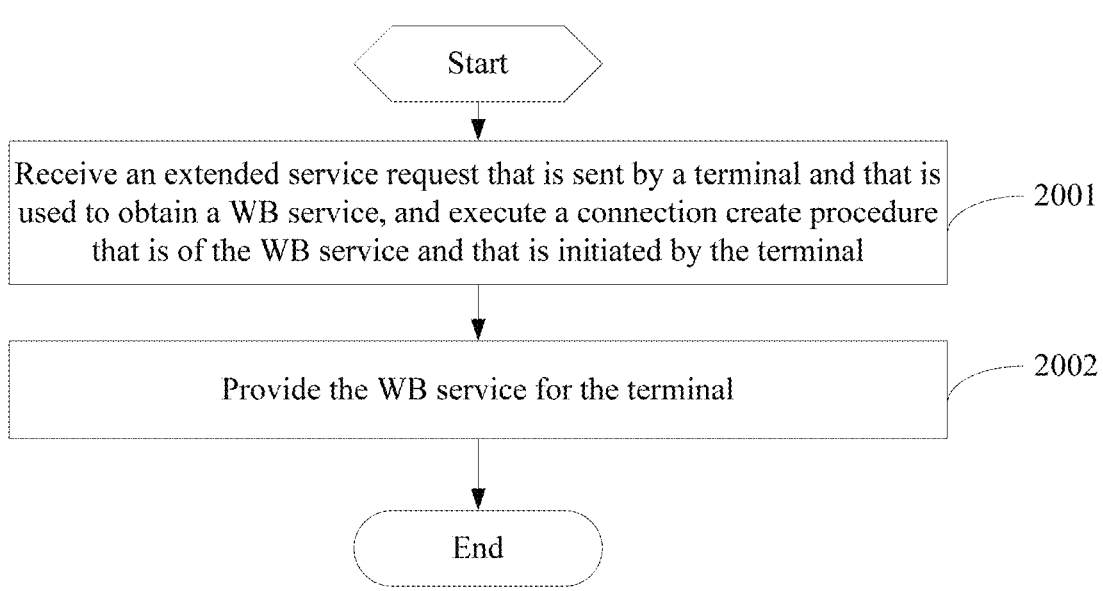

Referring to FIG. 20, FIG. 20 is a flowchart of another service transmission method according to an embodiment of the present disclosure, and the method is applied to a network node supporting a WB service. As shown in FIG. 20, the method includes the following steps.

Step 2001: Receive an extended service request that is sent by a terminal and that is used to obtain the WB service, and execute a connection create procedure that is of the WB service a d that is initiated by the terminal.

Step 2002: Provide the WB service for the terminal.

Optionally, before the receiving an extended service request that is sent by a terminal and that is used to obtain the WB service, the method further includes:

receiving an indication message sent by a network node supporting an NB service, where the indication message is used to indicate that the extended service request sent by the terminal to the network node supporting the WB service is used to obtain the WB service.

It should be noted that in this embodiment, step 2001 is replaceable, for example, is replaced with the following:

sending a fourth message to a network node supporting an NB service, where the fourth message is used to indicate that downlink data of the WB service is to be sent by a terminal.

Optionally, the fourth message includes a paging request.

Optionally, after the sending a fourth message to a network node supporting an NB service, the method further includes:

receiving a service request that is sent by the network node supporting the NB service and that is used to respond to the fourth message.

Optionally, after the providing the WB service for the terminal, the method further includes:

sending an indication message to an access network node supporting the WB service, where the indication message is used to instruct the access network node supporting the WB service to send information about a PLMN with which the terminal is registered last time.

It should be noted that for description of related steps in this embodiment, refer to the embodiment shown in FIG. 13. Details are not described herein. In this way, service experience of a user can be improved.

Figure 21:
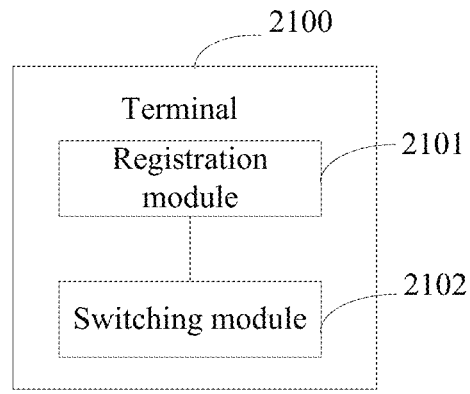
FIG. 21 to FIG. 25 are structural diagrams of a terminal according to an embodiment of the present disclosure.

Referring to FIG. 21, FIG. 21 is a structural diagram of a terminal according to an embodiment of the present disclosure. The terminal is a terminal supporting an NB capability and a WB capability. As shown in FIG. 21, a terminal 2100 includes:

a registration module 2101, configured to: camp on a network node supporting an NB service, and perform combined registration with a network supporting the NB service and a network supporting a WB service; and a switching module 2102, configured to switch to a network node supporting the WB service, to transmit the WB service.

Optionally, the registration module 2101 is configured to: camp on the network node supporting the NB service, and send a first message to the network node supporting the NB service, where the first message instructs the terminal to support the WB service.

Optionally, the first message includes:

a mobility and periodic registration update procedure, a mobility and periodic registration update procedure, an attach request, an initial registration request, or a tracking area update TAU request.

Optionally, the mobility and periodic registration update request includes a combined mobility and periodic registration update indication; or the attach request includes a combined attach indication; or the initial registration request includes a combined registration indication; or the TAU request includes a combined update indication.

Figure 22:
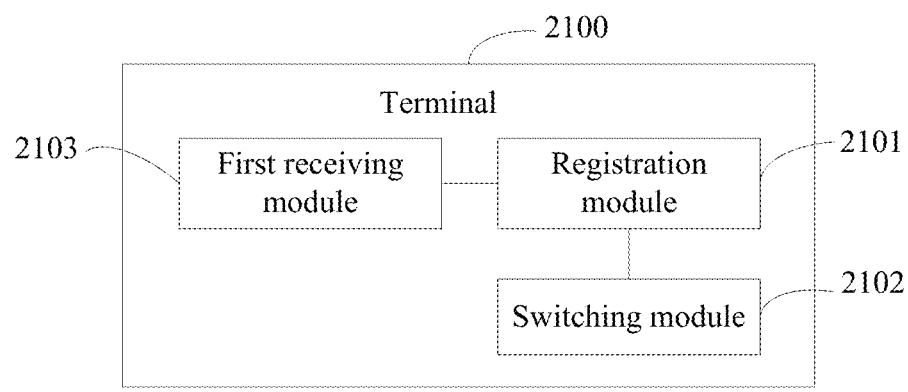

Optionally, as shown in FIG. 22, the terminal 2100 further includes:

a first receiving module 2103, configured to receive a response message of the first message from a network side of the NB service, where the response message includes at least one of the following:

an indication that the terminal successfully completes combined registration, an identifier of the network node supporting the WB service, and a TAI allocated to a WB system of the terminal.

Figure 23:
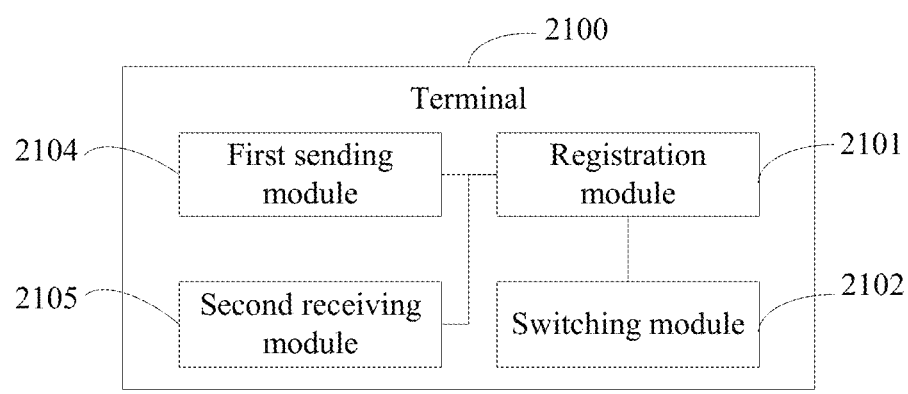

Optionally, as shown in FIG. 23, the terminal 2100 further includes:

a first sending module 2104, configured to send a second message to the network node supporting the NB service, where the second message is used to request the WB service; or a second receiving module 2105, configured to receive a third message sent by the network node supporting the NB service, where the third message is used to indicate that downlink data of the WB service is to be sent.

Optionally, the second message includes:

an extended service request.

Optionally, the switching module 2102 is configured to: send, to the network node supporting the WB service, the extended service request that is used to obtain the WB service;

and initiate a connection create procedure of the WB service to the network node supporting the WB service, to transmit the WB service.

Optionally, the first sending module 2104 is further configured to: if a cell supporting the WB service does not belong to a tracking area corresponding to the tracking area identity TAI that is of the WB system and that is received by the terminal, initiate an update procedure to the network node supporting the WB service.

Optionally, the update procedure is a registration update procedure, or the update procedure is a TAU procedure.

Optionally, the first sending module 2104 is further configured to send a suspend request to the network node supporting the NB service, where the suspend request is used to request to suspend the NB service.

Optionally, in a case that the terminal is in an idle state, the third message includes a paging message, and the paging message carries a WB indication; or in a case that the terminal is in a connected state, the third message includes a non-access stratum NAS notification message, and the NAS notification message carries a WB indication.

Figure 24:
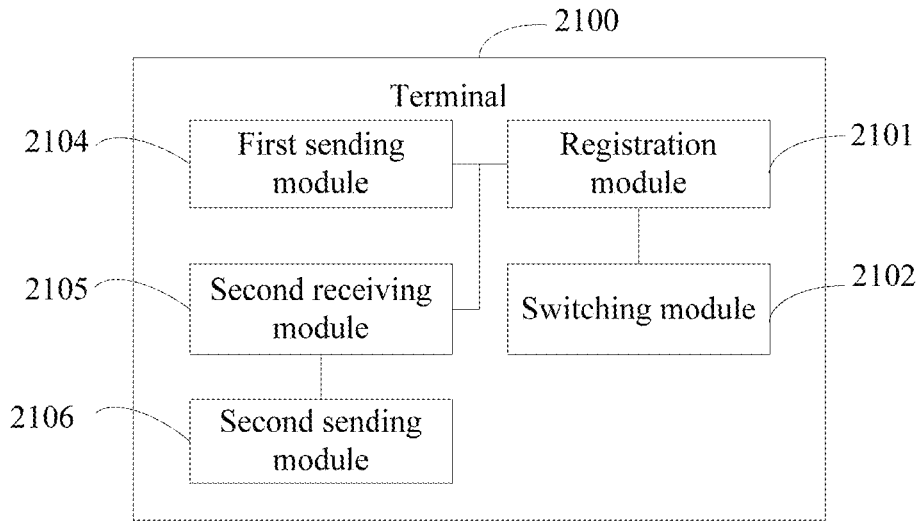

Optionally, as shown in FIG. 24, the terminal 2100 further includes:

a second sending module 2016, configured to send an extended service request to the network node supporting the NB service, where the extended service request is used to request the WB service.

Optionally, the switching module 2102 is further configured to switch to the network node supporting the NB service.

Figure 25:
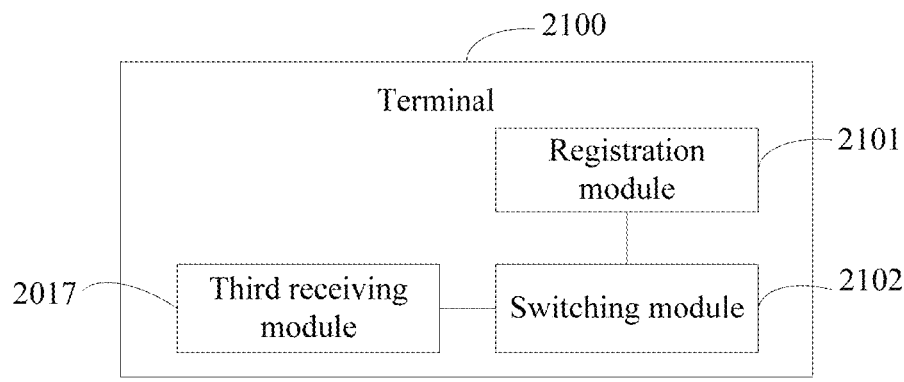

Optionally, as shown in FIG. 25, the terminal 2100 further includes:

a third receiving module 2107, configured to receive, from a network side of the WB service, information about a public land mobile network PLMN with which the terminal is registered last time.

The terminal provided in this embodiment of the present disclosure can implement the processes implemented by the terminal in the method embodiment in FIG. 5. To avoid repetition, details are not described herein again. In this way, service experience of a user can be improved.

Figure 26:
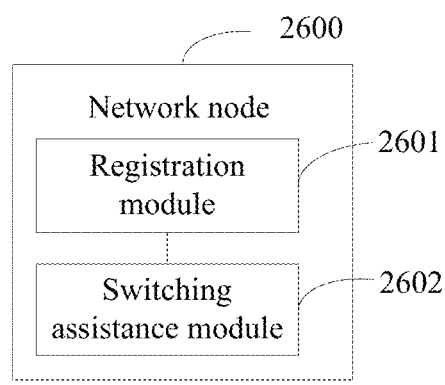
FIG. 26 to FIG. 38 are structural diagrams of a network node according to an embodiment of the present disclosure.

Referring to FIG. 26, FIG. 26 is a structural diagram of a network node according to an embodiment of the present disclosure. The network node is a network node supporting an NB service. As shown in FIG. 26, a network node 2600 includes:

a registration module 2601, configured to perform, for a terminal, combined registration with a network node supporting a WB service; and a switching assistance module 2602, configured to assist the terminal in switching to the network node supporting the WB service.

Optionally, the registration module 2601 is configured to receive a first message sent by the terminal, where the first message instructs the terminal to support the WB service.

Optionally, the first message includes:

a mobility and periodic registration update procedure request, an attach request, an initial registration request, or a TAU request.

Optionally, the mobility and periodic registration update request includes a combined mobility and periodic registration update indication; or the attach request includes a combined attach indication; or the initial registration request includes a combined registration indication; or the TAU request includes a combined update indication.

Optionally, the registration module 2601 is further configured to select, for the terminal, the network node supporting the WB service.

Optionally, the registration module 2601 is further configured to send a location update request to the network node supporting the WB service, where the location update request includes an identifier of the terminal.

Optionally, the location update request further includes at least one of the following:

a TAI, an identifier of the network node supporting the NB service, a location update type, a PLMN identifier of the WB service, and capability indication information, where the capability indication information indicates that the terminal supports the WB service.

Optionally, the registration module 2601 is further configured to receive a location update request response sent by the network node supporting the WB service, where the location update request response includes an identifier of the network node supporting the WB service.

Optionally, the registration module 2601 is further configured to send a response message of the first message to the terminal, where the response message includes at least one of the following:

an indication that the terminal successfully completes combined registration, an identifier of the network node supporting the WB service, and a TAI allocated to a WB system of the terminal.

Figure 27:
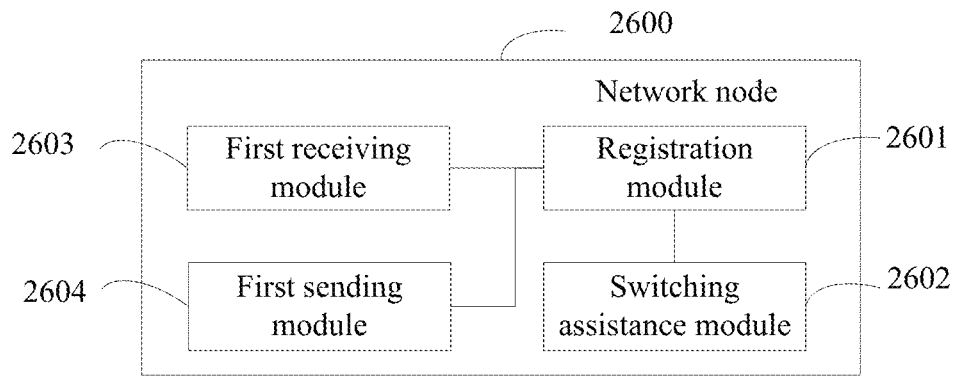

Optionally, as shown in FIG. 27, the network node 2600 further includes:

a first receiving module 2603, configured to receive a second message sent by the terminal, where the second message is used to request the WB service; or a first sending module 2604, configured to send a third message to the terminal, where the third message is used to indicate that downlink data of the WB service is to be sent.

Optionally, the second message includes:

an extended service request.

Optionally, the first receiving module 2603 is further configured to receive a suspend request sent by the terminal, where the suspend request is used to request to suspend the NB service.

Figure 28:
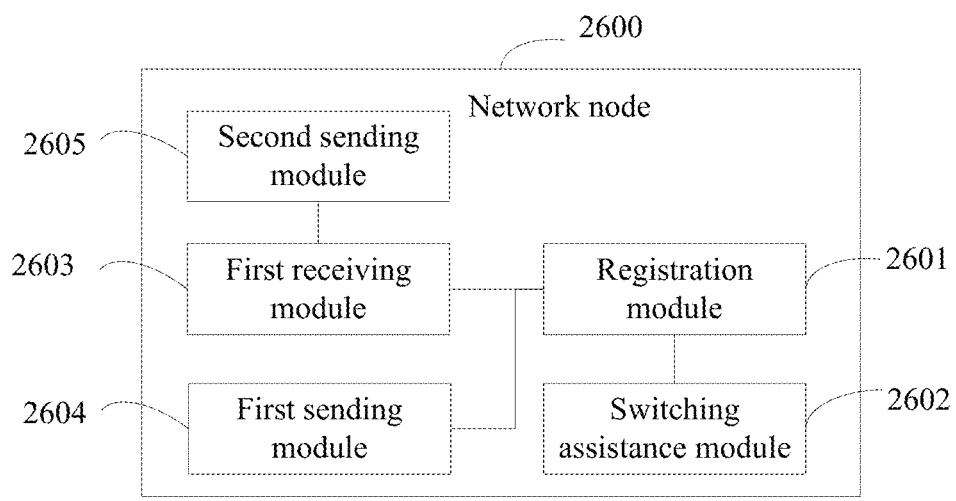

Optionally, as shown in FIG. 28, the network node 2600 further includes:

a second sending module 2605, configured to send an indication message to the network node supporting the WB service, where the indication message is used to indicate that the extended service request sent by the terminal to the network node supporting the WB service is used to obtain the WB service.

Optionally, in a case that the terminal is in an idle state, the third message includes a paging message, and the paging message carries a WB indication; or in a case that the terminal is in a connected state, the third message includes a non-access stratum NAS notification message, and the NAS notification message carries a WB indication.

Figure 29:
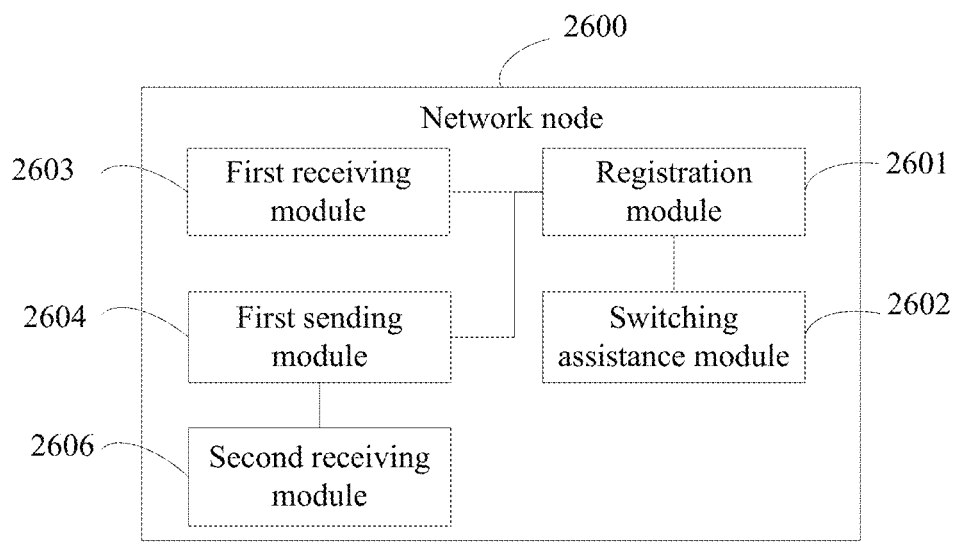

Optionally, as shown in FIG. 29, the network node 2600 further includes:

a second receiving module 2607, configured to receive a fourth message sent by the network node supporting the WB service, where the fourth message is used to indicate that the downlink data of the WB service is to be sent by the terminal.

Optionally, the fourth message includes a paging request.

Optionally, the second receiving module 2607 is further configured to receive an extended service request sent by the terminal, where the extended service request is used to request the WB service; and the first sending module 2604 is further configured to send, to the network node supporting the WB service, a service request that is used to respond to the fourth message.

Optionally, the switching assistance module 2602 is configured to send a UE context modification request to an access network node supporting the NB service, where the UE context modification request carries a WB indication.

Optionally, the UE context modification request further carries a tracking area identity TAI of a WB domain.

Optionally, the TAI of the WB domain includes a PLMN identifier of the WB domain.

Figure 30:
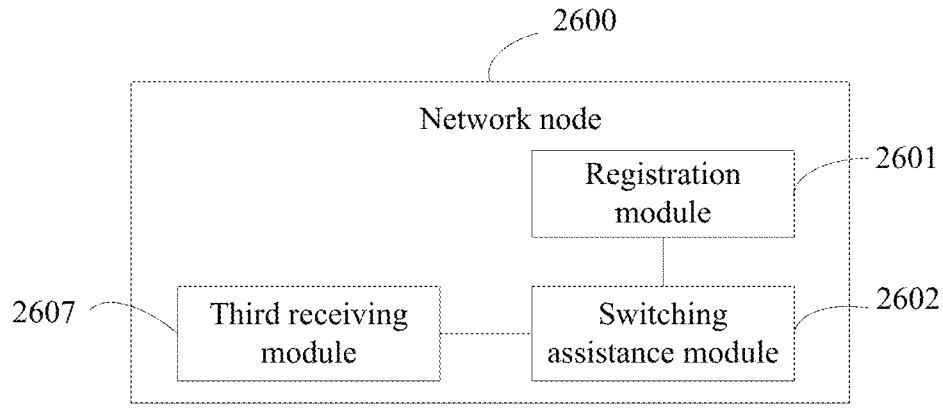

Optionally, as shown in FIG. 30, the network node 2600 further includes:
- a third receiving module 2607, configured to receive a UE context modification response sent by the access network node supporting the NB service.

Figure 31:
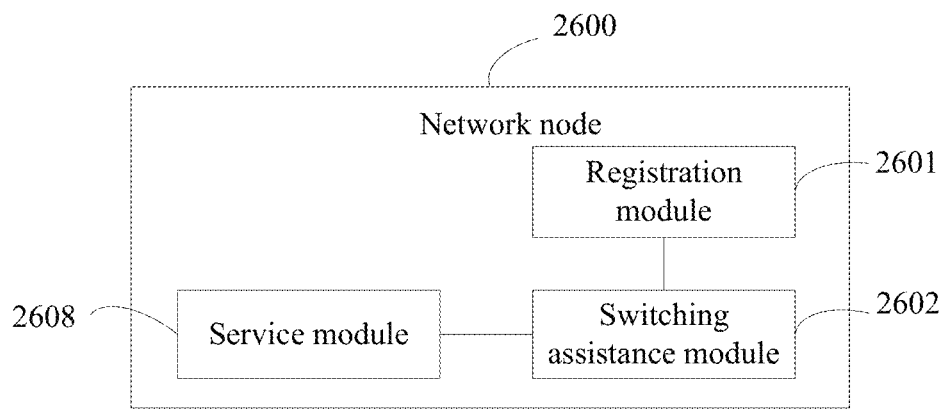

Optionally, as shown in FIG. 31, the network node 2600 further includes:
- a service module 2608, configured to provide the NB service for the terminal.

The network node provided in this embodiment of the present disclosure can implement the processes implemented by the network node in the method embodiment in FIG. 13. To avoid repetition, details are not described herein again. In this way, service experience of a user can be improved.

Figure 32:
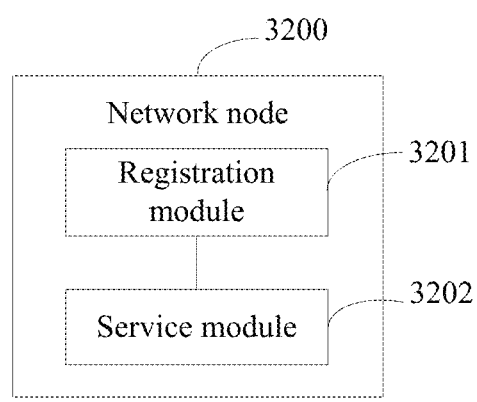

Referring to FIG. 32, FIG. 32 is a structural diagram of a network node according to an embodiment of the present disclosure. The network node is a network node supporting a WB service. As shown in FIG. 32, a network node 3200 includes:
- a registration module 3201, configured to accept a registration request initiated by a network node supporting an NB service for a terminal supporting the WB service; and
- a service module 3202, configured to provide the WB service for the terminal.

Optionally, the registration request includes a location update request, and the location update request includes an identifier of the terminal supporting the WB service.

Optionally, the location update request further includes at least one of the following:
- a TAI, an identifier of the network node supporting the NB service, a location update type, a PLMN identifier of the WB service, and capability indication information, where the capability indication information indicates that the terminal supports the WB service.

Figure 33:
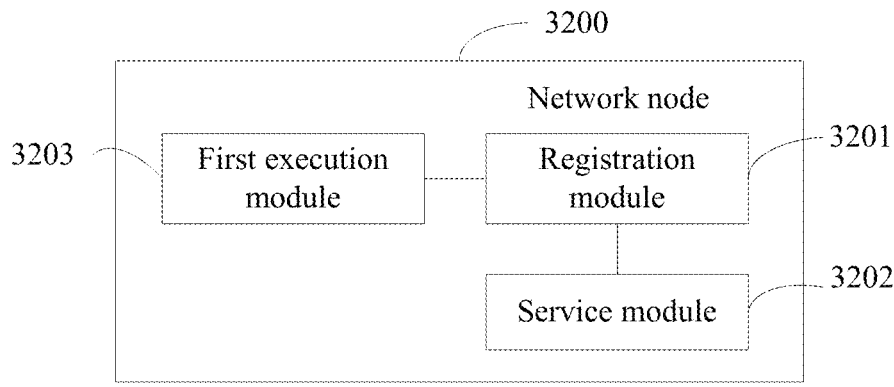

Optionally, as shown in FIG. 33, the network node 3200 further includes:
- a first execution module 3203, configured to execute a location update procedure of the WB service of the terminal.

Optionally, the first execution module 3203 is configured to: determine whether the terminal obtains a subscription of the WB service; and execute the location update procedure of the WB service of the terminal if the terminal obtains the subscription of the WB service.

Optionally, the first execution module 3203 is configured to: create a WB service association between the terminal and a subscription node, and notify the subscription node to provide the WB service for the terminal.

Figure 34:
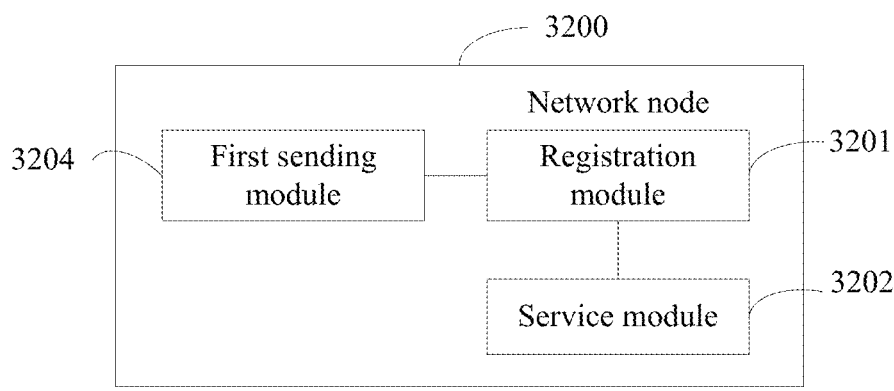

Optionally, as shown in FIG. 34, the network node 3200 further includes:
- a first sending module 3204, configured to send a location update request response to the network node supporting the NB service, where the location update request response includes an identifier of the network node supporting the WB service.

Figure 35:
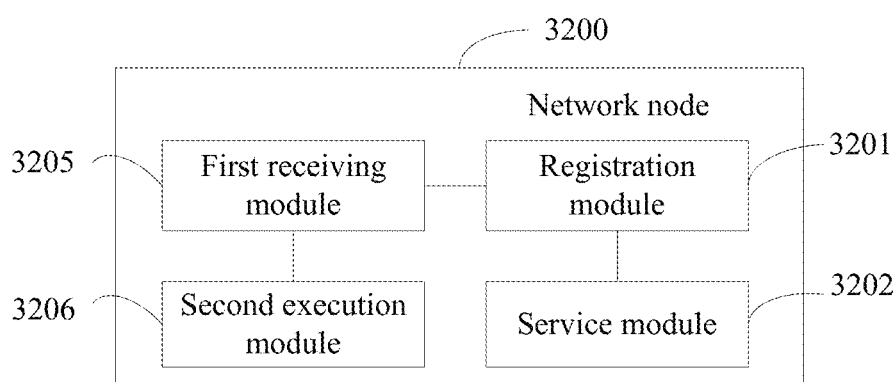

Optionally, as shown in FIG. 35, the network node 3200 further includes:
- a first receiving module 3205, configured to receive an extended service request that is sent by the terminal and that is used to obtain the WB service; and
- a second execution module 3206, configured to execute a connection create procedure that is of the WB service and that is initiated by the terminal.

Optionally, the first receiving module 3205 is further configured to receive an indication message sent by the network node supporting the NB service, where the indication message is used to indicate that the extended service request sent by the terminal to the network node supporting the WB service is used to obtain the WB service.

Figure 36:
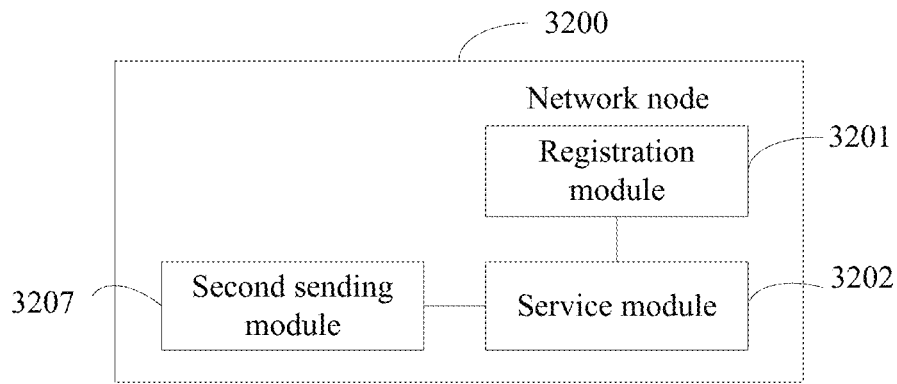

Optionally, as shown in FIG. 36, the network node 3200 further includes:
- a second sending module 3207, configured to send a fourth message to the network node supporting the NB service, where the fourth message is used to indicate that downlink data of the WB service is to be sent by the terminal.

Optionally, the fourth message includes a paging request.

Figure 37:
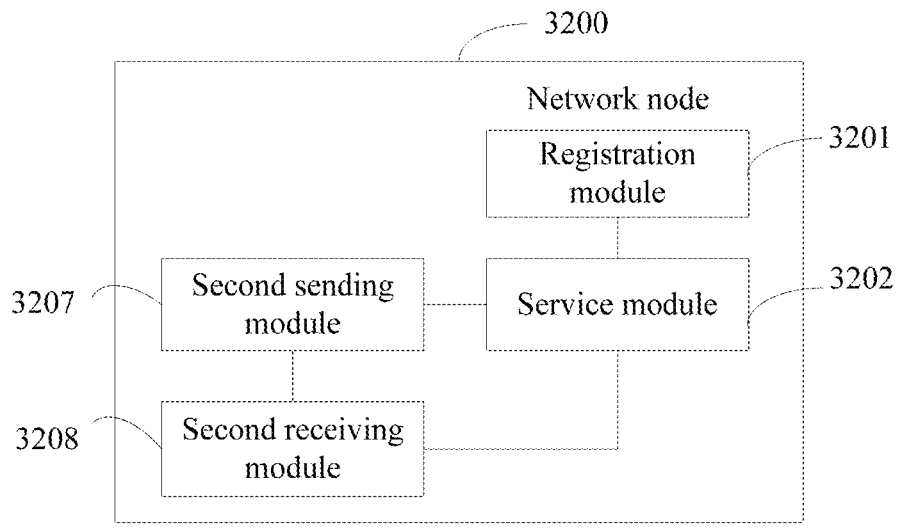

Optionally, as shown in FIG. 37, the network node 3200 further includes:
- a second receiving module 3208, configured to receive a service request that is sent by the network node supporting the NB service and that is used to respond to the fourth message.

Figure 38:
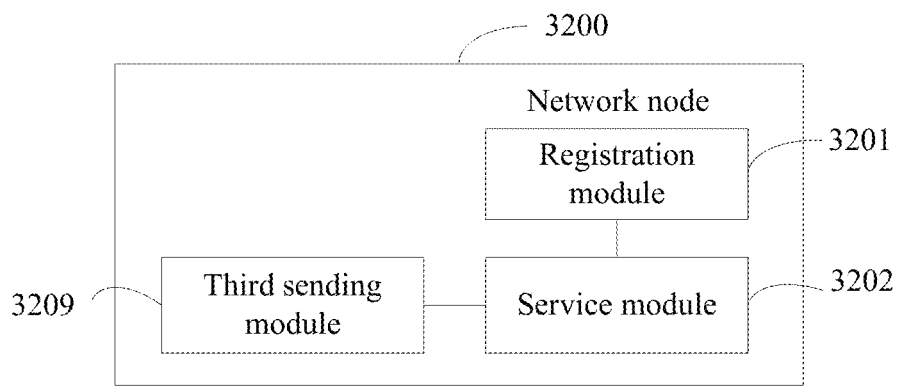

Optionally, as shown in FIG. 38, the network node 3200 further includes:
- a third sending module 3209, configured to send an indication message to an access network node supporting the WB service, where the indication message is used to instruct the access network node supporting the WB service to send information about a PLMN with which the terminal is registered last time.

The network node provided in this embodiment of the present disclosure can implement the processes implemented by the network node in the method embodiment in FIG. 14. To avoid repetition, details are not described herein again. In this way, service experience of a user can be improved.

Figure 39:
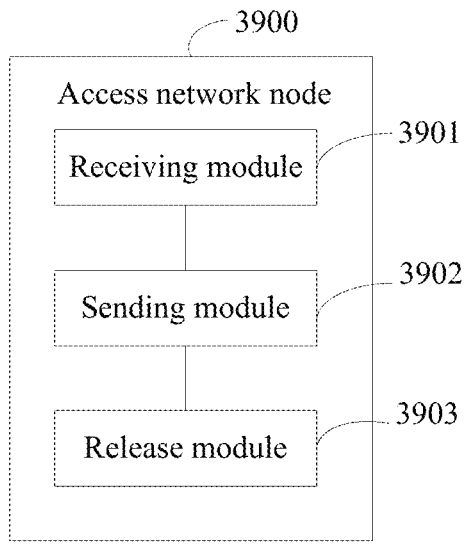
FIG. 39 to FIG. 41 are structural diagrams of an access network node according to an embodiment of the present disclosure.

Referring to FIG. 39, FIG. 39 is a structural diagram of an access network node according to an embodiment of the present disclosure. The access network node is an access network node supporting an NB service. As shown in FIG. 39, an access network node 3900 includes:
- a receiving module 3901, configured to receive a first radio resource control RRC message sent by a terminal supporting the NB service and a WB service, where a non-access stratum NAS message included in the first RRC message is an extended service request and is used to request the WB service;
- a sending module 3902, configured to send the extended service request to a network node supporting the NB service, where
  the receiving module 3902 is further configured to receive a UE context modification request sent by the network node supporting the NB service, where the UE context modification request carries a WB indication; and
- a release module 3903, configured to release a network resource allocated to the terminal.

Optionally, the UE context modification request further carries a TAI of a WB domain.

Optionally, the TAI of the WB domain includes a PLMN identifier of the WB domain.

Optionally, the sending module 3902 is further configured to send a UE context modification response to the network node supporting the NB service.

Optionally, the sending module 3902 is further configured to send a target message to the terminal, where the target message is used to indicate that downlink data of the WB service is to be sent.

Optionally, in a case that the terminal is in an idle state, the target message includes a paging message, and the paging message carries a WB indication; or
- in a case that the terminal is in a connected state, the target message is a second RRC message, the second RRC message includes a non-access stratum NAS notification message, and the NAS notification message carries a WB indication.

The network node provided in this embodiment of the present disclosure can implement the processes implemented by the access network node in the method embodiment in FIG. 15. To avoid repetition, details are not described herein again. In this way, service experience of a user can be improved.

Figure 40:
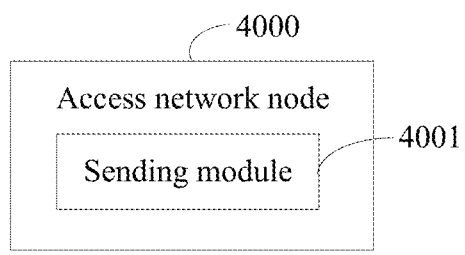

Referring to FIG. 40, FIG. 40 is a structural diagram of an access network node according to an embodiment of the present disclosure. The access network node is an access network node supporting an NB service and a WB service. As shown in FIG. 40, an access network node 4000 includes:
- a sending module 4001, configured to send, to a terminal supporting the WB service in an RRC connection release message, information about a PLMN with which the terminal is registered last time.

Optionally, an RRC connection is created by the terminal to send a NAS message to transmit the WB service, and the NAS message is an extended service request.

Figure 41:
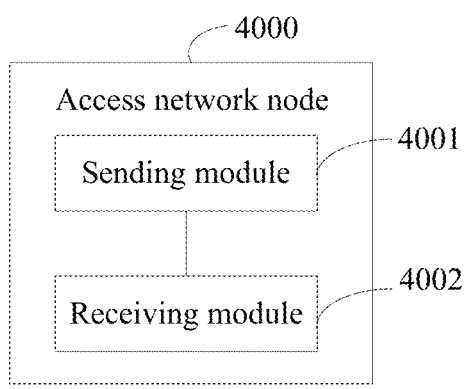

Optionally, as shown in FIG. 41, the access network node 4000 further includes:
- a receiving module 4002, configured to receive an indication message sent by a network node supporting the WB service, where the indication message is used to instruct to send, to the terminal, the information about the PLMN with which the terminal is registered last time.

The network node provided in this embodiment of the present disclosure can implement the processes implemented by the access network node in the method embodiment in FIG. 16. To avoid repetition, details are not described herein again. In this way, service experience of a user can be improved.

Figure 42:
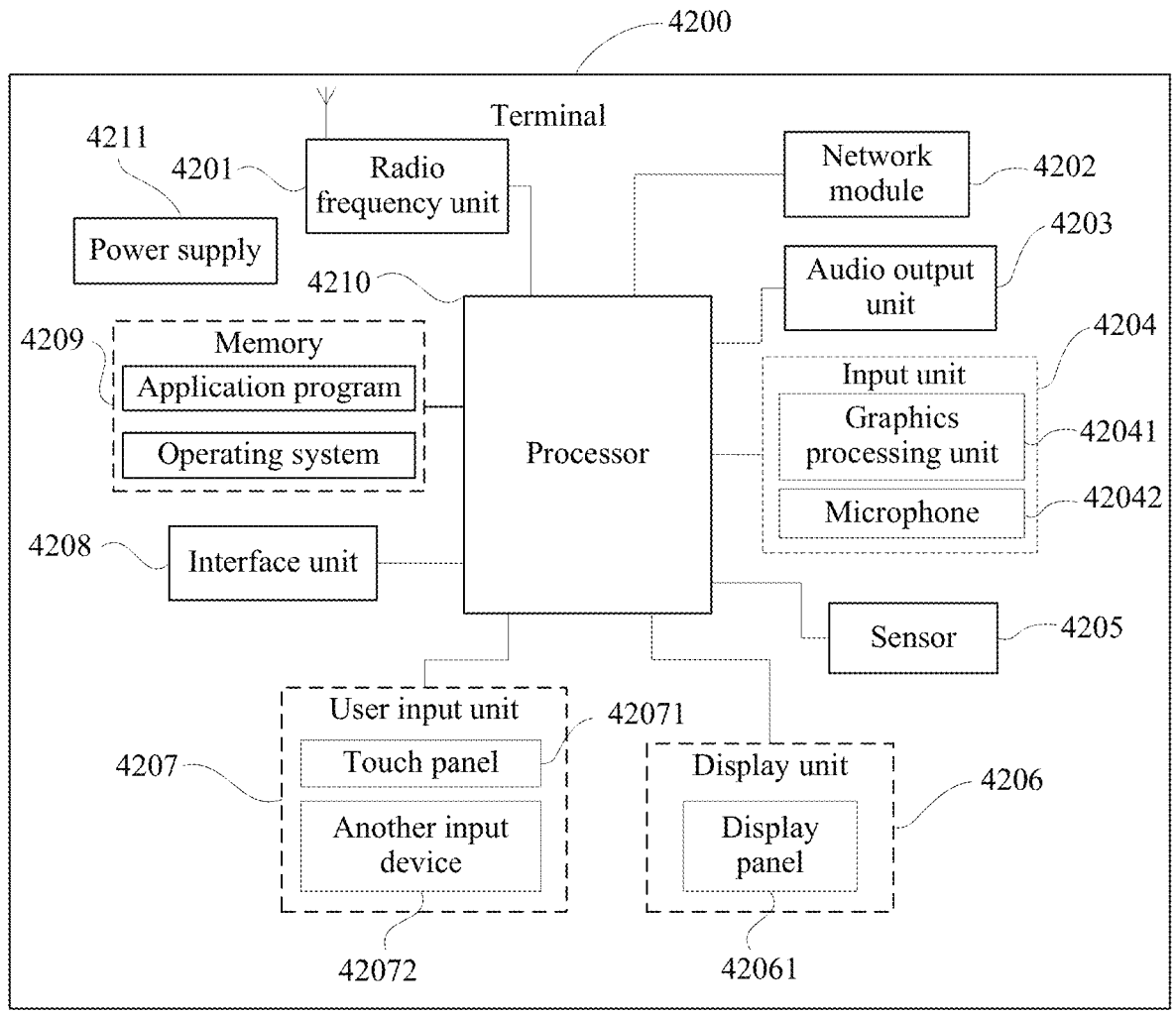
FIG. 42 is a structural diagram of another terminal according to an embodiment of the present disclosure.

FIG. 42 is a schematic structural diagram of hardware of a terminal for implementing the embodiments of the present disclosure. The terminal is a terminal supporting a narrowband NB capability and a wideband WB capability.

The terminal 4200 includes but is not limited to components such as a radio frequency unit 4201, a network module 4202, an audio output unit 4203, an input unit 4204, a sensor 4205, a display unit 4206, a user input unit 4207, an interface unit 4208, a memory 4209, a processor 4210, and a power supply 4211. A person skilled in the art may understand that the structure of the terminal shown in FIG. 42 does not constitute a limitation to the terminal. The terminal may include more or fewer components than that shown in the figure, or a combination of some components, or an arrangement of different components. In this embodiment of the present disclosure, the terminal includes but is not limited to a mobile phone, a tablet computer, a notebook computer, a palmtop computer, an in-vehicle terminal, a robot, a wearable device, a pedometer, and the like.

The radio frequency unit 4201 is configured to: camp on a network node supporting an NB service, and perform combined registration with a network supporting the NB service and a network supporting a WB service; and switch to a network node supporting the WB service, to transmit the WB service.

Optionally, the performing combined registration with a network supporting the NB service and a network supporting a WB service includes:
- sending a first message to the network node supporting the NB service, where the first message instructs the terminal to support the WB service.

Optionally, the first message includes:
- a mobility and periodic registration update procedure, a mobility and periodic registration update procedure, an attach request, an initial registration request, or a tracking area update TAU request.

Optionally, the mobility and periodic registration update request includes a combined mobility and periodic registration update indication; or
- the attach request includes a combined attach indication; or
- the initial registration request includes a combined registration indication; or
- the TAU request includes a combined update indication.

Optionally, after the sending a first message to the network node supporting the NB service, the radio frequency unit 4201 is further configured to:
- receive a response message of the first message from a network side of the NB service, where the response message includes at least one of the following:
- an indication that the terminal successfully completes combined registration, an identifier of the network node supporting the WB service, and a tracking area identity TAI allocated to a WB system of the terminal.

Optionally, before the switching to a network node supporting the wideband WB service, to transmit the WB service, the radio frequency unit 4201 is further configured to:
- send a second message to the network node supporting the NB service, where the second message is used to request the WB service; or
- receive a third message sent by the network node supporting the NB service, where the third message is used to indicate that downlink data of the WB service is to be sent.

Optionally, the second message includes:
an extended service request.

Optionally, the switching to a network node supporting the wideband WB service, to transmit the WB service includes:
- sending, to the network node supporting the WB service, the extended service request that is used to obtain the WB service; and
- initiating a connection create procedure of the WB service to the network node supporting the WB service, to transmit the WB service.

Optionally, before the sending, to the network node supporting the WB service, the extended service request that is used to obtain the WB service, the radio frequency unit 4201 is further configured to:
- if a cell supporting the WB service does not belong to a tracking area corresponding to the tracking area identity TAI that is of the WB system and that is received by the terminal, initiate an update procedure to the network node supporting the WB service.

Optionally, the update procedure is a registration update procedure, or the update procedure is a TAU procedure.

Optionally, after the sending a second message to the network node supporting the NB service, or receiving a third message sent by the network node supporting the NB service, the radio frequency unit 4201 is further configured to:

send a suspend request to the network node supporting the NB service, where the suspend request is used to request to suspend the NB service.

Optionally, in a case that the terminal is in an idle state, the third message includes a paging message, and the paging message carries a WB indication; or in a case that the terminal is in a connected state, the third message includes a non-access stratum NAS notification message, and the NAS notification message carries a WB indication.

Optionally, before the switching to a network node supporting the wideband WB service, to transmit the WB service, the radio frequency unit 4201 is further configured to:

send an extended service request to the network node supporting the NB service, where the extended service request is used to request the WB service.

Optionally, after the switching to a network node supporting the WB service, the radio frequency unit 4201 is further configured to:

switch to the network node supporting the NB service.

Optionally, before the switching to the network node supporting the NB service, the radio frequency unit 4201 is further configured to:

receive, from a network side of the WB service, information about a public land mobile network PLMN with which the terminal is registered last time.

The foregoing terminal can improve transmission performance.

It should be understood that, in this embodiment of the present disclosure, the radio frequency unit 4201 may be configured to receive and send information or a signal in a call procedure. Specifically, after receiving downlink data from a base station, the radio frequency unit 4201 sends the downlink data to the processor 4210 for processing. In addition, the radio frequency unit 4201 sends uplink data to the base station. Usually, the radio frequency unit 4201 includes but is not limited to an antenna, at least one amplifier, a transceiver, a coupler, a low noise amplifier, a duplexer, and the like. In addition, the radio frequency unit 4201 may communicate with a network and another device through a wireless communication system.

The terminal provides a user with wireless wideband Internet access by using the network module 4202, for example, helping the user send and receive emails, browse web pages, and access streaming media.

The audio output unit 4203 may convert audio data received by the radio frequency unit 4201 or the network module 4202 or stored in the memory 4209 into an audio signal and output the audio signal as a sound. In addition, the audio output unit 4203 may further provide an audio output (for example, a call signal received voice, or a message received voice) related to a specific function implemented by the terminal 4200. The audio output unit 4203 includes a speaker, a buzzer, a telephone receiver, and the like.

The input unit 4204 is configured to receive an audio or video signal. The input unit 4204 may include a graphics processing unit (GPU) 42041 and a microphone 42042. The graphics processing unit 42041 processes image data of a static image or video obtained by an image capture apparatus (such as, a camera) in a video capture mode or an image capture mode. A processed image frame may be displayed on the display unit 4206. The image frame processed by the graphics processing unit 42041 may be stored in the memory 4209 (or another storage medium) or sent by using the radio frequency unit 4201 or the network module 4202. The microphone 42042 may receive a sound and can process such sound into audio data. Processed audio data may be converted, in a call mode, into a format that can be sent to a mobile communication base station by using the radio frequency unit 4201 for output.

The terminal 4200 further includes at least one sensor 4205, for example, a light sensor, a motion sensor, and another sensor. Specifically, the light sensor includes an ambient light sensor and a proximity sensor. The ambient light sensor may adjust luminance of the display panel 42061 based on brightness of ambient light. The proximity sensor may turn off the display panel 42061 and/or backlight when the terminal 4200 moves to an ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 4205 may further include a fingerprint sensor, a pressure sensor, an iris sensor, a molecular sensor, a gyroscope, a barometer, a hygrometer, a thermometer, an infrared sensor, and the like. Details are not described herein.

The display unit 4206 is configured to display information entered by a user or information provided for a user. The display unit 4206 may include a display panel 42061. The display panel 42061 may be configured in a form of a liquid crystal display (LCD), an organic light-emitting diode (OLED), or the like.

The user input unit 4207 can be configured to receive input numeric or character information, and generate key signal inputs related to user settings and function control of the terminal. Specifically, the user input unit 4207 includes a touch panel 42071 and another input device 42072. The touch panel 42071 is also referred to as a touchscreen, and may collect a touch operation performed by a user on or near the touch panel 42071 (such as an operation performed by a user on the touch panel 42071 or near the touch panel 42071 by using any proper object or accessory, such as a finger or a stylus). The touch panel 42071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 4210, and can receive and execute a command sent by the processor 4210. In addition, the touch panel 42071 may be of a resistive type, a capacitive type, an infrared type, a surface acoustic wave type, or the like. The user input unit 4207 may include the another input device 42072 in addition to the touch panel 42071. Specifically, the another input device 42072 may include but is not limited to a physical keyboard, a function button (such as a volume control button or a power on/off button), a trackball, a mouse, a joystick, and the like. Details are not described herein.

Further, the touch panel 42071 may cover the display panel 42061. When detecting the touch operation on or near the touch panel 42071, the touch panel 42071 transmits the touch operation to the processor 4210 to determine a type of a touch event, and then the processor 4210 provides corresponding visual output on the display panel 42061 based on the type of the touch event. In FIG. 42, the touch panel 42071 and the display panel 42061 are used as two independent components to implement input and output functions of the terminal. However, in some embodiments, the touch panel 42071 and the display panel 42061 may be integrated to implement the input and output functions of the terminal. This is not specifically limited herein.

The interface unit 4208 is an interface for connecting an external apparatus with the terminal 4200. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 4208 may be configured to receive input (for example, data information and power) from an external apparatus and transmit the received input to one or more elements in the terminal 4200 or may be configured to transmit data between the terminal 4200 and an external apparatus.

The memory 4209 may be configured to store a software program and various data. The memory 4209 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 4209 may include a high-speed random access memory, or may include a nonvolatile memory, for example, at least one disk storage device, a flash memory, or another volatile solid-state storage device.

The processor 4210 is a control center of the terminal, and connects all parts of the entire terminal by using various interfaces and lines. By running or executing a software program and/or a module stored in the memory 4209 and invoking data stored in the memory 4209, the processor 4210 performs various functions of the terminal and data processing, to perform overall monitoring on the terminal. The processor 4210 may include one or more processing units. Optionally, an application processor and a modem processor may be integrated into the processor 4210. The application processor mainly processes an operating system, a user interface, an application program, and the like. The modem processor mainly processes wireless communications. It can be understood that, alternatively, the modem processor may not be integrated into the processor 4210.

The terminal 4200 may further include a power supply 4211 (for example, a battery) that supplies power to various components. Optionally, the power supply 4211 may be logically connected to the processor 4210 through a power supply management system, thereby achieving functions of managing charging, discharging, and power consumption through the power supply management system.

In addition, the terminal 4200 includes some functional modules not shown. Details are not described herein.

Optionally, an embodiment of the present disclosure further provides a terminal, including a processor 4210, a memory 4209, and a computer program that is stored in the memory 4209 and that can be run on the processor 4210. When the computer program is executed by the processor 4210, the processes of the foregoing registration switching method embodiment are implemented and a same technical effect can be achieved. To avoid repetition, details are not described herein again.

Figure 43:
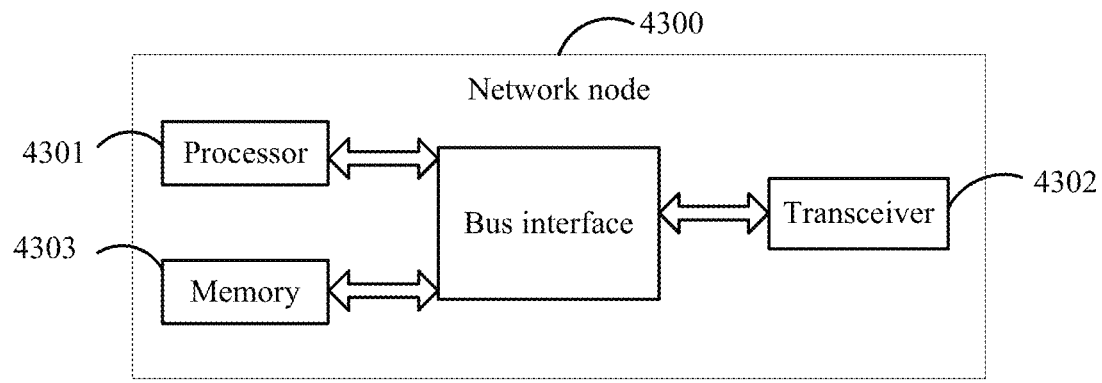
FIG. 43 is a structural diagram of another network node according to an embodiment of the present disclosure.

Referring to FIG. 43, FIG. 43 is a structural diagram of another network node according to an embodiment of the present disclosure. As shown in FIG. 43, a network node 4300 includes a processor 4301, a transceiver 4302, a memory 4303, and a bus interface.

In an embodiment, the network node is a network node supporting an NB service, and the transceiver 4302 is configured to:

perform, for a terminal, combined registration with a network node supporting a WB service; and assist the terminal in switching to the network node supporting the WB service.

Optionally, the performing, for a terminal, combined registration with a network node supporting a WB service includes:

receiving a first message sent by the terminal, where the first message instructs the terminal to support the WB service.

Optionally, the first message includes:

a mobility and periodic registration update procedure request, an attach request, an initial registration request, or a TAU request.

Optionally, the mobility and periodic registration update request includes a combined mobility and periodic registration update indication; or the attach request includes a combined attach indication; or the initial registration request includes a combined registration indication; or the TAU request includes a combined update indication.

Optionally, the performing, for a terminal, combined registration with a network node supporting a WB service further includes:

selecting, for the terminal, the network node supporting the WB service.

Optionally, the performing, for a terminal, combined registration with a network node supporting a WB service further includes:

sending a location update request to the network node supporting the WB service, where the location update request includes an identifier of the terminal.

Optionally, the location update request further includes at least one of the following:

a TAI, an identifier of the network node supporting the NB service, a location update type, a PLMN identifier of the WB service, and capability indication information, where the capability indication information indicates that the terminal supports the WB service.

Optionally, the performing, for a terminal, combined registration with a network node supporting a WB service further includes:

receiving a location update request response sent by the network node supporting the WB service, where the location update request response includes an identifier of the network node supporting the WB service.

Optionally, the performing, for a terminal, combined registration with a network node supporting a WB service further includes:

sending a response message of the first message to the terminal, where the response message includes at least one of the following:
an indication that the terminal successfully completes combined registration, an identifier of the network node supporting the WB service, and a TAI allocated to a WB system of the terminal.

Optionally, before the assisting the terminal in switching to the network node supporting the WB service, the transceiver 4302 is further configured to:
receive a second message sent by the terminal, where the second message is used to request the WB service; or
send a third message to the terminal, where the third message is used to indicate that downlink data of the WB service is to be sent.

Optionally, the second message includes:
an extended service request.

Optionally, after the assisting the terminal in switching to the network node supporting the WB service, the transceiver 4302 is further configured to:
receive a suspend request sent by the terminal, where the suspend request is used to request to suspend the NB service.

Optionally, after the receiving a second message sent by the terminal, the transceiver 4302 is further configured to:
send an indication message to the network node supporting the WB service, where the indication message is used to indicate that the extended service request sent by the terminal to the network node supporting the WB service is used to obtain the WB service.

Optionally, in a case that the terminal is in an idle state, the third message includes a paging message, and the paging message carries a WB indication; or
in a case that the terminal is in a connected state, the third message includes a non-access stratum NAS notification message, and the NAS notification message carries a WB indication.

Optionally, before the sending a third message to the terminal, the transceiver 4302 is further configured to:
receive a fourth message sent by the network node supporting the WB service, where the fourth message is used to indicate that the downlink data of the WB service is to be sent by the terminal.

Optionally, the fourth message includes a paging request.

Optionally, after the sending a third message to the terminal, the transceiver 4302 is further configured to:
receive an extended service request sent by the terminal, where the extended service request is used to request the WB service; and
send, to the network node supporting the WB service, a service request that is used to respond to the fourth message.

Optionally, the assisting the terminal in switching to the network node supporting the WB service includes:
sending a UE context modification request to an access network node supporting the NB service, where the UE context modification request carries a WB indication.

Optionally, the UE context modification request further carries a tracking area identity TAI of a WB domain.

Optionally, the TAI of the WB domain includes a PLMN identifier of the WB domain.

Optionally, after the sending a UE context modification request to an access network node supporting the NB service, the transceiver 4302 is further configured to:
receive a UE context modification response sent by the access network node supporting the NB service.

Optionally, after the assisting the terminal in switching to the network node supporting the WB service, the transceiver 4302 is further configured to: provide the NB service for the terminal.

In another embodiment, the network node is a network node supporting a WB service, and the transceiver 4302 is configured to:
accept a registration request initiated by a network node supporting an NB service for a terminal supporting the WB service; and
provide the WB service for the terminal.

Optionally, the registration request includes a location update request, and the location update request includes an identifier of the terminal supporting the WB service.

Optionally, the location update request further includes at least one of the following:
a TAI, an identifier of the network node supporting the NB service, a location update type, a PLMN identifier of the WB service, and capability indication information, where the capability indication information indicates that the terminal supports the WB service.

Optionally, after the accepting a registration request initiated by a network node supporting an NB service for a terminal supporting the WB service, the transceiver 4302 is further configured to:
execute a location update procedure of the WB service of the terminal.

Optionally, the executing a location update procedure of the WB service of the terminal includes:
determining whether the terminal obtains a subscription of the WB service; and
executing the location update procedure of the WB service of the terminal if the terminal obtains the subscription of the WB service.

Optionally, the executing a location update procedure of the WB service of the terminal includes:
creating a WB service association between the terminal and a subscription node, and notifying the subscription node to provide the WB service for the terminal.

Optionally, after the accepting a registration request initiated by a network node supporting an NB service for a terminal supporting the WB service, the transceiver 4302 is further configured to:
send a location update request response to the network node supporting the NB service, where the location update request response includes an identifier of the network node supporting the WB service.

Optionally, before the transmitting the WB service to the terminal, the transceiver 4302 is further configured to:
receive an extended service request that is sent by the terminal and that is used to obtain the WB service; and
execute a connection create procedure that is of the WB service and that is initiated by the terminal.

Optionally, before the receiving an extended service request that is sent by the terminal and that is used to obtain the WB service, the transceiver 4302 is further configured to:
receive an indication message sent by the network node supporting the NB service, where the indication message is used to indicate that the extended service request sent by the terminal to the network node supporting the WB service is used to obtain the WB service.

Optionally, before the transmitting the WB service to the terminal, the transceiver 4302 is further configured to:

send a fourth message to the network node supporting the NB service, where the fourth message is used to indicate that downlink data of the WB service is to be sent by the terminal.

Optionally, the fourth message includes a paging request.

Optionally, after the sending a fourth message to the network node supporting the NB service, the transceiver 4302 is further configured to:

receive a service request that is sent by the network node supporting the NB service and that is used to respond to the fourth message.

Optionally, after the providing the WB service for the terminal, the transceiver 4302 is further configured to:

send an indication message to an access network node supporting the WB service, where the indication message is used to instruct the access network node supporting the WB service to send information about a PLMN with which the terminal is registered last time.

The foregoing network node can improve service experience of a user.

The transceiver 4302 is configured to receive and send data under the control of the processor 4301. The transceiver 4302 includes at least two antenna ports.

In FIG. 43, the bus architecture may include any number of interconnected buses and bridges, which are specifically linked together by various circuits of one or more processors represented by the processor 4301 and a memory represented by the memory 4303. The bus architecture may further link various other circuits such as a peripheral device, a voltage regulator, and a power management circuit. These are well known in the art, and therefore are not further described in this specification. The bus interface provides an interface. The transceiver 4302 may be a plurality of components. To be specific, the transceiver 4302 includes a transmitter and a receiver, and provides a unit configured to communicate with various other apparatuses on a transmission medium. For different user equipment, a user interface 4304 may also be an interface capable of connecting externally and internally to a required device. The connected device includes but is not limited to a keypad, a display, a speaker, a microphone, a joystick, and the like.

The processor 4301 is responsible for managing the bus architecture and common processing, and the memory 4303 may store data used when the processor 4301 performs an operation.

Optionally, an embodiment of the present disclosure further provides a network node, including a processor 4301, a memory 4303, and a computer program that is stored in the memory 4303 and that can be run on the processor 4301. When the computer program is executed by the processor 4301, the processes of the foregoing registration switching method embodiment are implemented and a same technical effect can be achieved. To avoid repetition, details are not described herein again.

Figure 44:
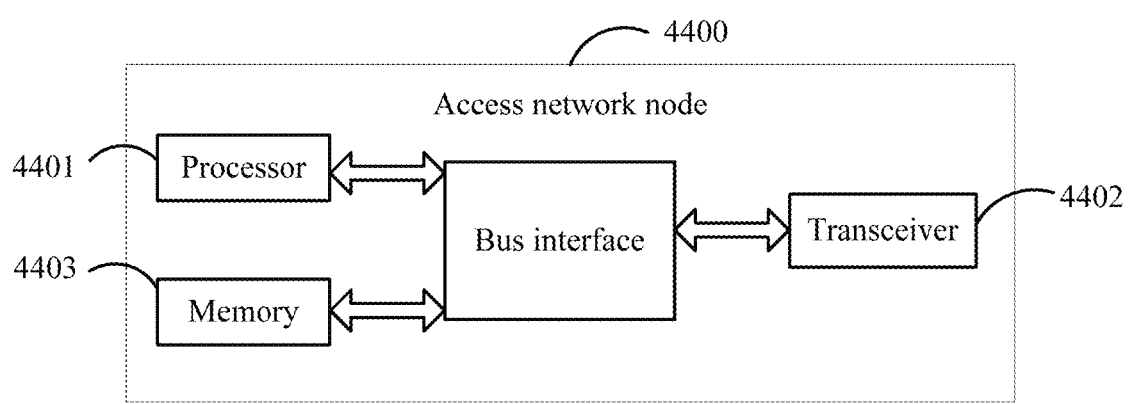
FIG. 44 is a structural diagram of another access network node according to an embodiment of the present disclosure.

Referring to FIG. 44, FIG. 44 is a structural diagram of another access network node according to an embodiment of the present disclosure. As shown in FIG. 44, an access network node 4400 includes a processor 4401, a transceiver 4402, a memory 4403, and a bus interface.

In an embodiment, the access network node is an access network node supporting an NB service, and the transceiver 4402 is configured to:

receive a first radio resource control RRC message sent by a terminal supporting the NB service and a WB service, where a non-access stratum NAS message included in the first RRC message is an extended service request and is used to request the WB service;

send the extended service request to a network node supporting the NB service; and receive a UE context modification request sent by the network node supporting the NB service, where the UE context modification request carries a WB indication; and the processor 4401 is configured to release a network resource allocated to the terminal.

Optionally, the UE context modification request further carries a TAI of a WB domain.

Optionally, the TAI of the WB domain includes a PLMN identifier of the WB domain.

Optionally, after the receiving a UE context modification request sent by the network node supporting the NB service, the transceiver 4402 is further configured to: send a UE context modification response to the network node supporting the NB service.

Optionally, before the receiving an extended service request sent by the terminal supporting the WB service, the transceiver 4402 is further configured to:

send a target message to the terminal, where the target message is used to indicate that downlink data of the WB service is to be sent.

Optionally, in a case that the terminal is in an idle state, the target message includes a paging message, and the paging message carries a WB indication; or in a case that the terminal is in a connected state, the target message is a second RRC message, the second RRC message includes a non-access stratum NAS notification message, and the NAS notification message carries a WB indication.

In another embodiment, the access network node is an access network node supporting a WB service, and the transceiver 4402 is configured to:

send, to a terminal supporting an NB service and the WB service in an RRC connection release message, information about a PLMN with which the terminal is registered last time.

Optionally, an RRC connection is created by the terminal to send a NAS message to transmit the WB service, and the NAS message is an extended service request.

Optionally, before the sending, to a terminal supporting the WB service, information about a PLMN with which the terminal is registered last time, the transceiver 4402 is further configured to:

receive an indication message sent by a network node supporting the WB service, where the indication message is used to instruct to send, to the terminal, the information about the PLMN with which the terminal is registered last time.

The foregoing access network node can improve service experience of a user.

The transceiver 4402 is configured to receive and send data under the control of the processor 4401. The transceiver 4402 includes at least two antenna ports.

In FIG. 44, the bus architecture may include any number of interconnected buses and bridges, which are specifically linked together by various circuits of one or more processors represented by the processor 4401 and a memory represented by the memory 4403. The bus architecture may further link various other circuits such as a peripheral device, a voltage regulator, and a power management circuit. These are well known in the art, and therefore are not further described in this specification. The bus interface provides an interface. The transceiver 4402 may be a plurality of components. To be specific, the transceiver 4402 includes a transmitter and a receiver, and provides a unit configured to communicate with various other apparatuses on a transmission medium. For different user equipment, a user interface 4404 may also be an interface capable of connecting externally and internally to a required device. The connected device includes but is not limited to a keypad, a display, a speaker, a microphone, a joystick, and the like.

The processor 4401 is responsible for managing the bus architecture and common processing, and the memory 4403 may store data used when the processor 4401 performs an operation.

Optionally, an embodiment of the present disclosure further provides an access network node, including a processor 4401, a memory 4403, and a computer program that is stored in the memory 4403 and that can be run on the processor 4401. When the computer program is executed by the processor 4401, the processes of the foregoing request processing method or information sending method embodiment are implemented and a same technical effect can be achieved. To avoid repetition, details are not described herein again.

An embodiment of the present disclosure provides a computer-readable storage medium. The computer-readable storage medium stores a computer program, and when the computer program is executed by a processor, the steps of the registration switching method on the terminal side provided in the embodiments of the present disclosure are implemented; or when the computer program is executed by a processor, the steps of the registration switching method on the network node side supporting the NB service provided in the embodiments of the present disclosure are implemented; or when the computer program is executed by a processor, the steps of the registration switching method on the network node side supporting the WB service provided in the embodiments of the present disclosure are implemented; or when the computer program is executed by a processor, the steps of the request processing method provided in the fourth aspect are implemented; or when the computer program is executed by a processor, the steps of the information sending method provided in the fifth aspect are implemented, and a same technical effect can be achieved. To avoid repetition, details are not described herein again. The computer-readable storage medium is, for example, a read-only memory (ROM), a random access memory (RAM), a magnetic disk, or an optical disc.

It should be noted that, in this specification, the terms "include", "comprise", or their any other variant is intended to cover a non-exclusive inclusion, so that a procedure, a method, an article, or an apparatus that includes a list of elements not only includes those elements but also includes other elements which are not expressly listed, or further includes elements inherent to such procedure, method, article, or apparatus. An element limited by "includes a . . . " does not, without more constraints, preclude the presence of additional identical elements in the procedure, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network node, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

What is claimed is:

1. A registration switching method, wherein the method is applied to a terminal supporting a narrowband (NB) capability and a wideband (WB) capability and comprises:

camping on a network node supporting an NB service, and performing combined registration with a network supporting the NB service and a network supporting a WB service; and switching to a network node supporting the WB service, to transmit the WB service;

wherein before the switching to a network node supporting the WB service, to transmit the WB service, the method further comprises:

sending a second message to the network node supporting the NB service, wherein the second message is used to request the WB service; or receiving a third message sent by the network node supporting the NB service, wherein the third message is used to indicate that downlink data of the WB service is to be sent.

2. The method according to claim 1, wherein the performing combined registration with a network supporting the NB service and a network supporting a WB service comprises:

sending a first message to the network node supporting the NB service, wherein the first message indicates that the terminal supports the WB service.

3. The method according to claim 2, wherein the first message comprises:

a mobility and periodic registration update request, an attach request, an initial registration request, or a tracking area update (TAU) request;

wherein the mobility and periodic registration update request comprises a combined mobility and periodic registration update indication; or the attach request comprises a combined attach indication; or the initial registration request comprises a combined registration indication; or the TAU request comprises a combined update indication.

4. The method according to claim 2, wherein after the sending a first message to the network node supporting the NB service, the method further comprises:

receiving a response message of the first message from a network side of the NB service, wherein the response message comprises at least one of the following:

an indication that the terminal successfully completes combined registration, an identifier of the network node supporting the WB service, and a tracking area identity (TAI) allocated to a WB system of the terminal.

5. The method according to claim 1, wherein the second message comprises:
an extended service request;
wherein the switching to a network node supporting the wideband WB service, to transmit the WB service comprises:
sending, to the network node supporting the WB service, the extended service request that is used to obtain the WB service; and
initiating a connection create procedure of the WB service to the network node supporting the WB service, to transmit the WB service.

6. The method according to claim 5, wherein before the sending, to the network node supporting the WB service, the extended service request that is used to obtain the WB service, the method further comprises:
if a cell supporting the WB service does not belong to a tracking area corresponding to the tracking area identity TAI that is of the WB system and that is received by the terminal, initiating an update procedure to the network node supporting the WB service.

7. The method according to claim 1, wherein after the sending a second message to the network node supporting the NB service, or receiving a third message sent by the network node supporting the NB service, the method further comprises:
sending a suspend request to the network node supporting the NB service, wherein the suspend request is used to request to suspend the NB service.

8. The method according to claim 1, wherein in a case that the terminal is in an idle state, the third message comprises a paging message, and the paging message carries a WB indication; or
in a case that the terminal is in a connected state, the third message comprises a non-access stratum (NAS) notification message, and the NAS notification message carries a WB indication.

9. The method according to claim 8, wherein before the switching to a network node supporting the wideband WB service, to transmit the WB service, the method further comprises:
sending an extended service request to the network node supporting the NB service, wherein the extended service request is used to request the WB service.

10. The method according to claim 1, wherein after the switching to a network node supporting the WB service, the method further comprises:
switching to the network node supporting the NB service;
wherein before the switching to the network node supporting the NB service, the method further comprises:
receiving, from a network side of the WB service, information about a public land mobile network (PLMN) with which the terminal is registered last time.

11. A terminal, wherein the terminal is a terminal supporting an NB capability and a WB capability and comprises a memory, a processor, and a program that is stored in the memory and that can be run on the processor, wherein when the program is executed by the processor, the steps of the registration switching method according to claim 1 are implemented.

* * * * *